United States Patent
Katar et al.

(10) Patent No.: US 9,614,585 B2
(45) Date of Patent: Apr. 4, 2017

(54) SWITCHING COMMUNICATION DEVICES BETWEEN DIFFERENT COMMUNICATION MEDIA

(71) Applicant: QUALCOMM Incorporated, San Diego, CA (US)

(72) Inventors: Srinivas Katar, Ocala, FL (US); Rouhana Rouhana, Ocala, FL (US); Hao Zhu, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 13/754,466

(22) Filed: Jan. 30, 2013

(65) Prior Publication Data

US 2014/0211863 A1 Jul. 31, 2014

(51) Int. Cl.
*B60L 1/00* (2006.01)
*B60L 3/00* (2006.01)
(Continued)

(52) U.S. Cl.
CPC .............. *H04B 3/54* (2013.01); *B60L 3/0069* (2013.01); *B60L 11/1816* (2013.01);
(Continued)

(58) Field of Classification Search
USPC .............................. 307/10.1; 375/257; 701/22
See application file for complete search history.

(56) References Cited

U.S. PATENT DOCUMENTS 8,315,930 B2   11/2012   Littrell
2009/0144150 A1   6/2009   Sakakibara et al.
(Continued)

FOREIGN PATENT DOCUMENTS

CN   102574476   7/2012
CN   102648110   8/2012
(Continued)

OTHER PUBLICATIONS

"PCT Application No. PCT/US2014/013911 International Search Report", Nov. 28, 2014, 9 pages.
(Continued)

*Primary Examiner* — Hal Kaplan
*Assistant Examiner* — Xuan Ly
(74) *Attorney, Agent, or Firm* — DeLizio Law, PLLC

(57) ABSTRACT

A service provider device of a local communication network communicates a first frame with an electric vehicle via a first communication medium to associate with the electric vehicle, establish a communication link with the electric vehicle, and to add the electric vehicle to the local communication network. After an association process between the electric vehicle and the service provider device is successfully completed, the electric vehicle and/or the service provider device can execute operations that extend the utility of their respective communication devices by switching to a new communication medium. By switching to the new communication medium, the electric vehicle and/or the service provider device can connect to a remote communication network. The service provider device communicates a second frame with at least a network device of the remote communication network via the new communication medium.

43 Claims, 12 Drawing Sheets

(51) Int. Cl.
  *H02G 3/00* (2006.01)
  *H04B 3/54* (2006.01)
  *B60L 11/18* (2006.01)
(52) U.S. Cl.
  CPC ....... *B60L 11/1824* (2013.01); *B60L 11/1846* (2013.01); *B60L 11/1861* (2013.01); *B60L 2240/70* (2013.01); *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2010/0010704 A1 | 1/2010 | Uchida |
| 2010/0228415 A1* | 9/2010 | Paul .................. B60L 8/003 701/22 |
| 2011/0215758 A1 | 9/2011 | Staehlin et al. |
| 2012/0029728 A1 | 2/2012 | Hirayama et al. |
| 2012/0112697 A1* | 5/2012 | Heuer .................. B60L 11/1818 320/109 |
| 2012/0139489 A1 | 6/2012 | Gaul et al. |
| 2012/0221703 A1 | 8/2012 | Schwager |
| 2012/0309455 A1 | 12/2012 | Klose et al. |
| 2013/0321024 A1* | 12/2013 | Muller .................. G01R 31/40 324/764.01 |

FOREIGN PATENT DOCUMENTS

| | | |
|---|---|---|
| DE | 102010016751 | * 11/2011 |
| TW | 201223793 | 6/2012 |
| TW | 201236307 | 9/2012 |
| WO | 2012099978 A2 | 7/2012 |

OTHER PUBLICATIONS

"PCT Application No. PCT/US2014/013911 Written Opinion", Apr. 14, 2015, 14 Pages.

"Taiwan Application No. 103102508 Office Action", May 20, 2016, 21 pages.

* cited by examiner

SWITCHING COMMUNICATION DEVICES BETWEEN DIFFERENT COMMUNICATION MEDIA

BACKGROUND

Embodiments of the inventive subject matter generally relate to the field of communication networks and, more particularly, to switching communication devices between different communication media.

Electric vehicles typically charge from conventional power outlets or dedicated charging stations. Prior to receiving electric power from a charging station, the charging station can ensure that the user of the electric vehicle has a valid account and proper authorization to receive the electric power and to pay for the received electric power.

SUMMARY

Various embodiments for switching communication devices between different communication media are disclosed. In one embodiment, a service provider device of a local communication network establishes a first communication link between the service provider device and an electric vehicle via a first communication medium. The electric vehicle is added to the local communication network via the first communication link. The service provider device is then communicatively coupled to a remote communication network via a second communication medium. A second communication link between the service provider device and a network device of the remote communication network is established via the second communication medium.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
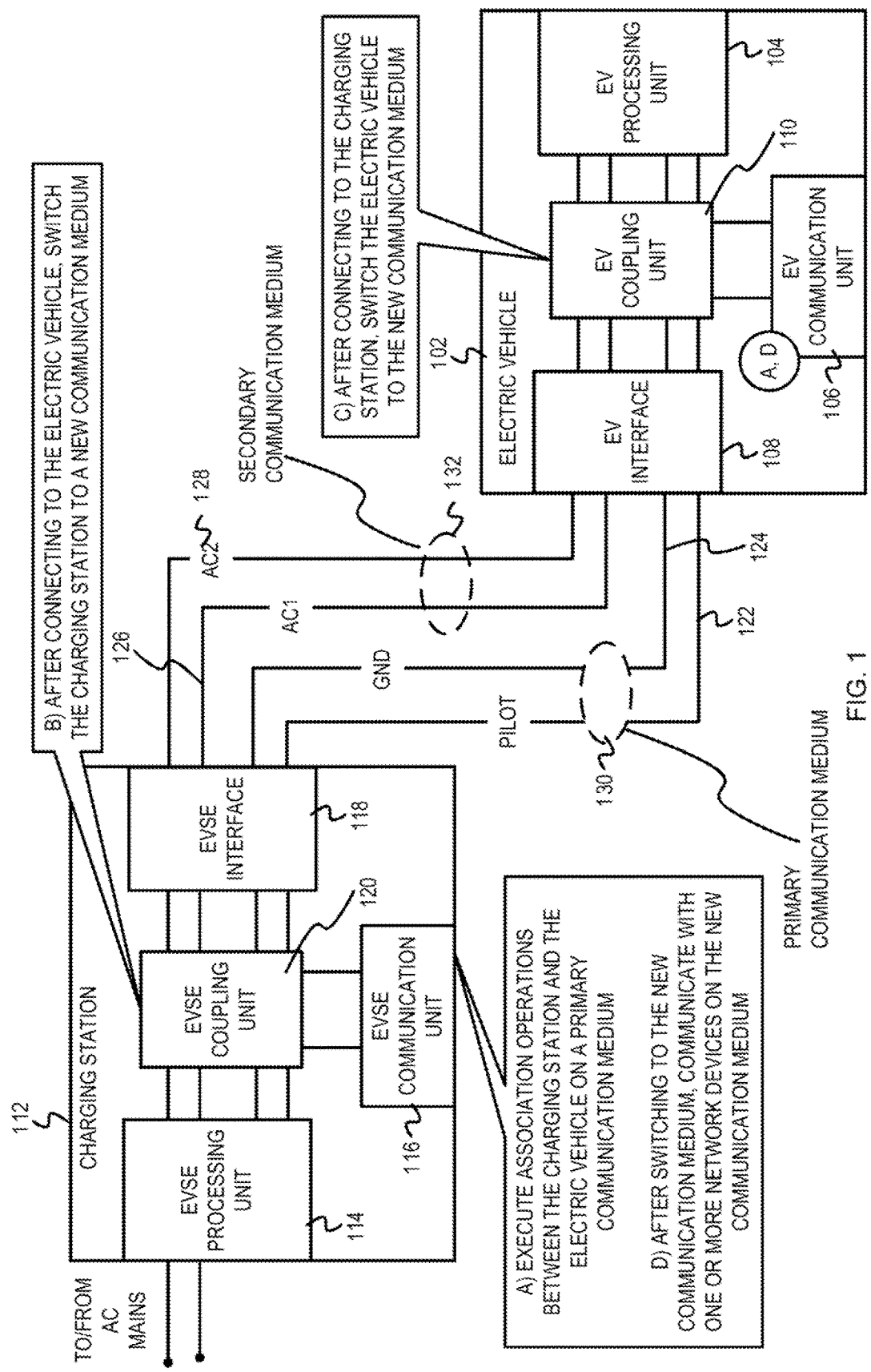
FIG. 1 is an example conceptual diagram illustrating an electric vehicle and a charging station including a mechanism for switching to a new communication medium.

The description that follows includes exemplary systems, methods, techniques, instruction sequences, and computer program products that embody techniques of the present inventive subject matter. However, it is understood that the described embodiments may be practiced without these specific details. For instance, although examples refer to operations for switching devices between different communication media in a powerline communication (PLC) environment, embodiments are not so limited. In other embodiments, the operations for switching communication devices between different communication media can be extended to various other communication media (e.g., Ethernet, Coax, etc.) In other instances, well-known instruction instances, protocols, structures, and techniques have not been shown in detail in order not to obfuscate the description.

An electric vehicle (EV) can connect to a charging station (also known as electric vehicle supply equipment or EVSE) using a charging harness. The charging harness can comprise at least four constituent wires—a pilot wire, a ground wire, and two AC power supply wires (AC1 and AC2). In current implementations, communication devices (e.g., HomePlug® GreenPHY modules, HomePlug AV modules, etc.) on the electric vehicle and the charging station typically use the pilot wire and the ground wire as a physical medium ("primary communication medium") to exchange communications for association and billing (e.g., for an electric vehicle charging process or an EV-EVSE association process). After the EV-EVSE association process is complete, the charging station can provide electric power to charge the electric vehicle using the AC1 and the AC2 wires. The primary communication medium comprising the pilot and the ground wires may still be used (if needed) for subsequent communication between the electric vehicle and the charging station. However, in the current implementation, the communication devices (e.g., the HomePlug modules) of the electric vehicle and the charging station are typically idle while the charging station is providing electric power to the electric vehicle. Restricting the electric vehicle and the charging station to communicate only with each other and only via the primary communication medium can limit the communication capabilities of the communication devices of the electric vehicle and the charging station. This can limit the ability of the electric vehicle and charging station to communicate with other devices (e.g., PLC devices) in other communication networks connected to the powerline medium (e.g., comprising the AC1 and the AC2 wires).

In some embodiments, the electric vehicle and/or the charging station can execute operations extend the utility of the communication devices on the electric vehicle and/or the charging station by switching to a new communication medium. After the association process is completed (and the electric vehicle starts receiving electric power from the charging station), the electric vehicle and/or the charging station can switch to the new communication medium. The new communication medium can be a secondary communication medium (e.g., a physical medium formed by the AC1 and AC2 wires) or a combined communication medium that is a combination of the primary and secondary communication media (e.g., a physical medium formed by a combination of the pilot, ground, AC1, and AC2 wires). Switching the communication devices of the electric vehicle and/or the charging station to the new communication medium can extend the functionality of the electric vehicle and/or the charging station. Switching the electric vehicle and/or charging station to the new communication medium can enable the electric vehicle and/or the charging station to communicate with other network devices (e.g., PLC devices) connected to the secondary communication medium (e.g., the AC mains). For example, switching to the secondary communication medium can enable the electric vehicle to communicate with a home network media server (e.g., to download content, connect to the Internet, etc.) and can enable the charging station to communicate with other charging stations and an Internet gateway (e.g., using the AC mains).

FIG. 1 is an example conceptual diagram illustrating an electric vehicle 102 and a charging station 112 including a mechanism for switching to a new communication medium. The electric vehicle 102 comprises an EV processing unit 104, an EV communication unit 106, an EV interface 108, and an EV coupling unit 110. The EV interface 108 facilitates communication between the electric vehicle 102 and the charging station 112. The EV processing unit 104 can execute one or more operations for processing messages scheduled for transmission from the electric vehicle 102 and for processing messages received at the electric vehicle 102. The EV coupling unit 110 couples the EV processing unit 104 to the EV communication unit 106 and/or the EV interface 108 depending on the communication medium to which the electric vehicle 102 is coupled. The charging station 112 comprises an EVSE processing unit 114, an EVSE communication unit 116, an EVSE interface 118, and an EVSE coupling unit 120. The EVSE interface 118 facilitates communication between the electric vehicle 102 and the charging station 112. The EVSE processing unit 114 can execute one or more operations for processing messages scheduled for transmission from the charging station 112 and for processing messages received at the charging station 112. The EVSE coupling unit 120 couples the EVSE processing unit 114 to the EVSE communication unit 116 and/or to the EVSE interface 118 depending on the communication medium to which the charging station 112 is coupled. Thus, the coupling units 110 and 120 can be configured to switch the electric vehicle 102 and the charging station 112 respectively between multiple communication media. In one embodiment, the communication units 106 and 116 can each comprise a powerline communication (PLC) module that implements functionality for powerline communication between the electric vehicle 102 and the charging station 112. In one embodiment, the communication units 106 and 116 can comprise a HomePlug communication module that executes functionality for exchanging communications using the HomePlug communication standards, such as HomePlug AV, HomePlug GreenPHY, etc.

Figure 2:
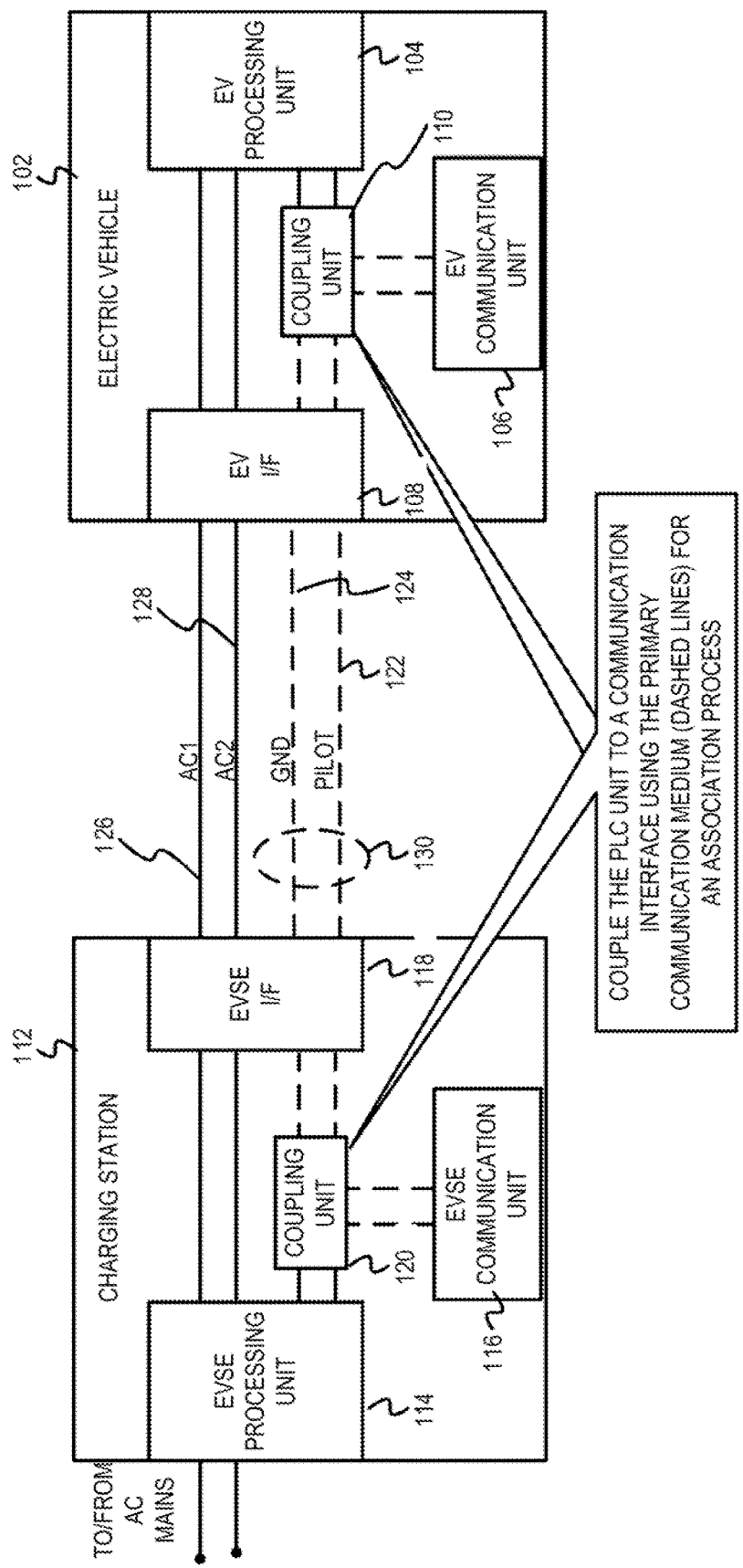
FIG. 2 is an example conceptual diagram illustrating an electric vehicle and a charging station coupled via a primary communication medium.

To charge the electric vehicle 102, a user can plug in the electric vehicle 102 at a charging facility. As depicted in FIG. 1, the electric vehicle 102 can be coupled to the charging station 112 using a charging harness (also referred to as a charging cable). In one embodiment, the charging harness can comprise four constituent wires—a control pilot (CPLT) wire 122, a ground (GND) wire 124, a first AC supply wire (AC1) 126, and a second AC supply wire (AC2) 128. The electric vehicle 102 can execute an association process with the charging stations and can select a charging station (e.g., the charging station 112) from which to receive electric power. The electric vehicle 102 and the charging station 112 can exchange communications using a primary communication medium 130 that is formed by the pilot wire 122 and the ground wire 124. At stage A, the EV communication unit 106 and the EVSE communication unit 116 can execute association operations on the primary communication medium 130 to connect the electric vehicle 102 to the charging station 112 and to validate the electric vehicle 102, as will be described with reference to FIG. 2. In FIG. 2, the electric vehicle 102 and the charging station 112 are coupled via the primary communication medium 130. In one embodiment, in using the primary communication medium 130 for communicating, the electric vehicle 102 and the charging station 112 can use the pilot wire 122 and the ground wire 124 as the physical medium. The primary communication medium 130 is depicted in FIG. 2 by dashed lines. As depicted in FIG. 2, in the charging station 112, the EVSE coupling unit 120 couples the EVSE communication unit 116 to the EVSE interface 118 using the pilot wire 122 and the ground wire 124. In the electric vehicle 102, the EV coupling unit 110 couples the EV communication unit 106 to the EV interface 108 using the pilot wire 122 and the ground wire 124. Accordingly, in the example of FIG. 2, the electric vehicle 102 and the charging station 112 can communicate with each other over the primary communication medium 130 (i.e., the pilot wire 122 and the ground wire 124) to associate with each other and exchange billing and other information. In some embodiments, the electric vehicle 102 and the charging station 112 may transmit their respective transmissions (over the primary communication medium 130) with a transmit power that is less than the power limits specified in, e.g., HomePlug communication standards.

Referring back to FIG. 1, after the association process is complete and billing information (e.g., user account information, availability of funds to pay for electric power and/or other services provided to the electric vehicle 102) is verified, the electric vehicle 102 can receive the electric power from the charging station 112 via the AC mains (i.e., the AC1 wire 126 and the AC2 wire 128). After the association process is complete (and while the electric vehicle 102 is receiving the electric power), the communication units 106 and 116 (e.g., PLC modules) of the electric vehicle 102 and the charging station 112 may be idle for a long period of time. In accordance with some embodiments (as will be described below in FIGS. 3-11), after the association process is complete and billing information is verified, the electric vehicle 102 and/or the charging station 112 (e.g., the communication devices 106 and/or 116) can switch to a new communication medium to extend the functionality of the electric vehicle 102 and/or the charging station 112 and to execute other applications and tasks.

As depicted in FIG. 1, at stage B, the EVSE coupling unit 120 can switch the EVSE communication unit 116 to the new communication medium. In some embodiments, the new communication medium may be a secondary communication medium 132 that is formed by the AC1 wire 126 and the AC2 wire 128. The secondary communication medium 132 may be a powerline communication medium (e.g., comprising one or more powerline networks). In another embodiment, the secondary communication medium 132 may be formed by other suitable wires (e.g., the AC1 wire 126 and the ground wire 124, etc.) and may be distinct from the primary communication medium 130. In another embodiment, the new communication medium may be a combined communication medium that is a combination of the primary communication medium 130 and the secondary communication medium 132. For example, the combined communication medium can be formed by a combination of the pilot wire 122, the ground wire 124, the AC1 wire 126, and the AC2 wire 128. At stage C, the EV coupling unit 110 can switch the EV communication unit 106 to the new communication medium. As discussed above, the new communication medium may be the secondary communication medium 132 formed by the AC1 and AC2 wires, a secondary communication medium may be formed by other suitable combination of wires, or a combination of the primary communication medium 130 and the secondary communication medium 132. In some embodiments, the EV coupling unit 110 can comprise functionality to determine whether to switch the electric vehicle 102 to the new communication medium, when to switch the electric vehicle 102 to the new communication medium, and to accordingly switch the electric vehicle 102 to the new communication medium. Likewise, the EVSE coupling unit 120 can comprise functionality to determine whether to switch the charging station 112 to another communication medium, when to switch the charging station 112 to another communication medium, and to accordingly switch the charging station 112 to another communication medium. In other embodiments, the coupling units 110 and 120 may not comprise functionality to determine whether/when to switch the electric vehicle 102 and the charging station 112 respectively to the new communication medium. Instead, the communication units 106 and 116 may execute functionality to determine whether/when to switch the electric vehicle 102 and the charging station 112 respectively to the new communication medium. The communication units 106 and 116 can notify the coupling units 110 and 120 respectively, to switch the electric vehicle 102 and the charging station 112 to the new communication medium, as needed.

At stage D, if the charging station 112 is switched to the new communication medium, the EVSE communication unit 116 can communicate with one or more network devices on the new communication medium. Similarly, if the electric vehicle 102 is switched to the new communication medium, the EV communication unit 106 can communicate with one or more network devices on the new communication medium. For example, after switching to the secondary communication medium 132, the charging station 112 (e.g., the EVSE communication unit 116) may join a remote powerline network on the secondary communication medium 132 (e.g., that exchanges communications using the AC1 wire 126 and the AC2 wire 128). The EVSE communication unit 116 may connect to a remote network router to access the Internet and to authenticate the electric vehicle 102 (e.g., for billing). Likewise, after switching to the secondary communication medium 132, the electric vehicle 102 (e.g., the EV communication unit 106) may join a remote powerline network on the secondary communication medium 132 (e.g., that exchanges communications using the AC1 wire 126 and the AC2 wire 128). The EV communication unit 106 may connect to the remote network router to download content (e.g., maps, etc.). As will be further discussed below, if the electric vehicle 102 and/or the charging station 112 switch to the combined communication medium, the electric vehicle 102 and/or the charging station 112 can simultaneously communicate on the primary communication medium 130 and the secondary communication medium 132.

It is noted that although FIG. 2 depicts the electric vehicle 102 and the charging station 112 associating with each other using the primary communication medium 130 formed by the pilot wire 122 and the ground wire 124 (e.g., during the EV-EVSE association process), embodiments are not so limited. In other embodiments, the electric vehicle 102 and the charging station 112 can use another suitable communication medium (e.g., a physical medium formed by the AC1 and AC2 wires, a physical medium formed by the AC1 and ground wires, etc.) to associate with each other and to exchange billing information for the EV-EVSE association process. Although FIG. 1 depicts the charging station 112 and the electric vehicle 102 switching to the new communication medium (see stages B and C), embodiments are not so limited. In some embodiments, only the electric vehicle 102 may switch to the new communication medium (depicted in FIGS. 3-4). In other embodiments, only the charging station 112 may switch to the new communication medium (depicted in FIGS. 5-6).

Figure 3:
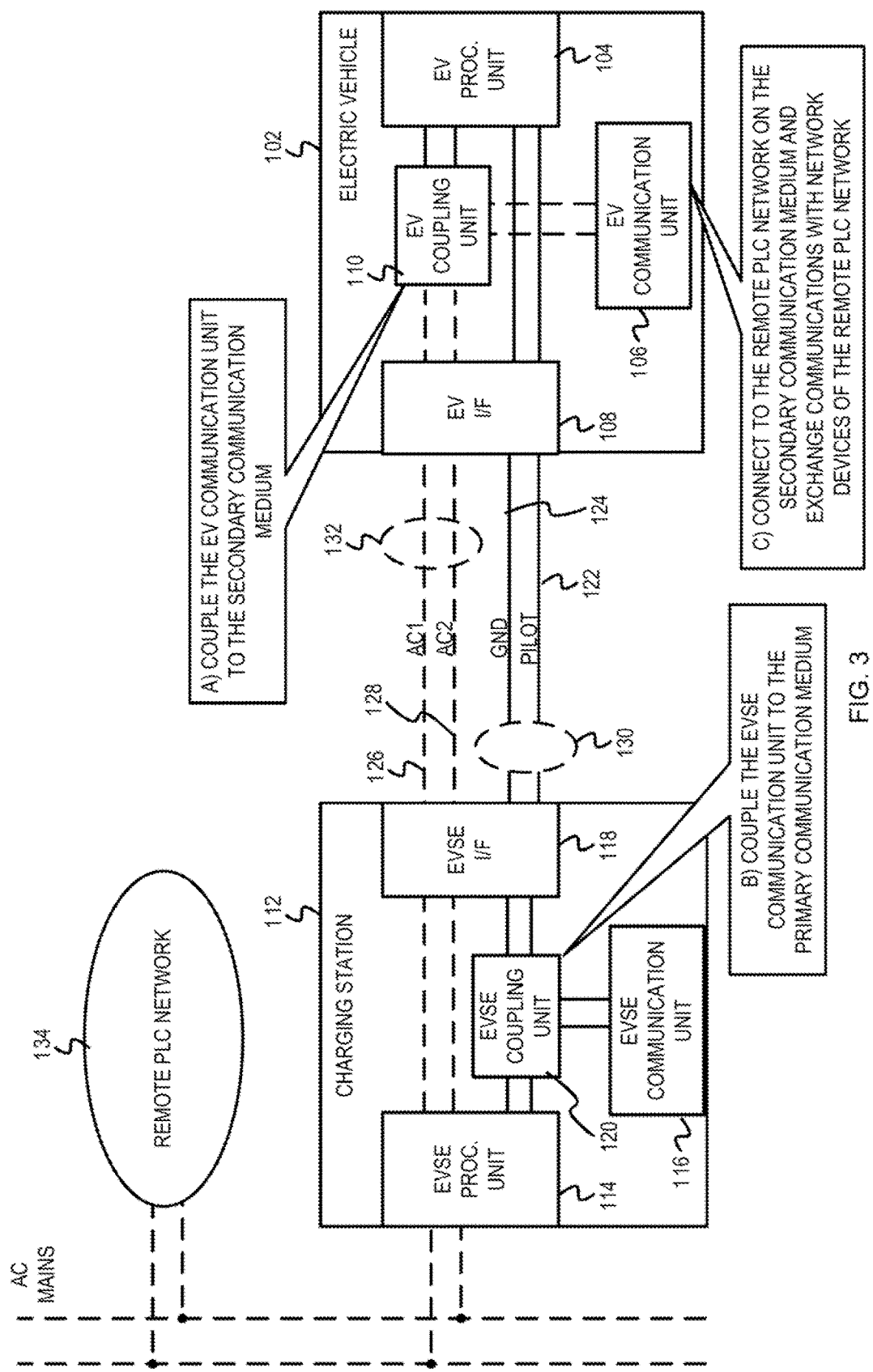
FIG. 3 is an example conceptual diagram illustrating one embodiment of an electric vehicle communication module switching to a new communication medium.

FIG. 3 is an example conceptual diagram illustrating one embodiment of an electric vehicle communication module switching to a new communication medium. In the example of FIG. 3, after associating with the charging station 112, the EV communication unit 106 (or the EV coupling unit 110) can determine to switch the electric vehicle 102 from the primary communication medium 130 to the new communication medium. In the example of FIG. 3, the new communication medium is the secondary communication medium 132 and is distinct from the primary communication medium 130. In the example of FIG. 3, the primary communication medium 130 (depicted by solid lines) is the physical medium formed by the pilot wire 122 and the ground wire 124, while the secondary communication medium 132 (depicted by dashed lines) is the physical medium formed by the AC1 wire 126 and the AC2 wire 128. In the example of FIG. 3, at stage A, only the electric vehicle 102 may be switched to the secondary communication medium 132. The EV coupling unit 110 couples the EV communication unit 106 to the secondary communication medium 132 comprising the AC1 wire 126 and the AC2 wire 128. At stage B, the charging station 112 may remain coupled to the primary communication medium 130 (and a local communication network comprising the charging station 112). The EVSE coupling unit 120 couples the EVSE communication unit 116 to the primary communication medium 130 comprising the pilot wire 122 and the ground wire 124. Furthermore, the secondary communication medium 132 also comprises a remote powerline communication network 134 (e.g., a HomePlug network). In other words, network devices in the remote PLC network 134 can exchange communications using the AC1 wire 126 and the AC2 wire 128. At stage C, after switching to the secondary communication medium 132, the electric vehicle 102 (e.g., the EV communication unit 106) can join the remote PLC network 134 (e.g., by associating with a coordinating network device of the remote PLC network 134). In some embodiments, the remote PLC network can be a home network or another suitable powerline network. As part of the remote PLC network 134, the electric vehicle 102 can perform additional operations such as synchronizing information with a home network server, downloading content (e.g., maps, music, video, etc.), and other suitable operations.

In some embodiments, the EV communication unit 106 may determine when to switch from one communication medium to the other communication medium. The EV communication unit 106 may accordingly direct the EV coupling unit 110 to couple the EV communication unit 106 to the appropriate communication medium. In other embodiments, the EV coupling unit 110 may determine when the electric vehicle 102 should switch from one communication medium to the other communication medium and may accordingly couple the EV communication unit 106 to the appropriate communication medium. In some embodiments, the electric vehicle 102 (e.g., the EV communication unit 106 and/or the EV coupling unit 110) may have apriori knowledge of a communication schedule of the charging station 112. In other words, the electric vehicle 102 may "know" when the charging station 112 will transmit messages to the electric vehicle 102. The EV communication unit 106 may be switched to the secondary communication medium 132 if it is determined that the electric vehicle 102 will not receive any communications from the charging station 112. The electric vehicle 102 may be switched back to the primary communication medium 130 before the charging station 112 is expected to transmit a message to the electric vehicle 102 (e.g., based on the communication schedule). In other embodiments, the electric vehicle 102 may receive a notification when the charging station 112 will transmit a message to the electric vehicle 102 on the primary communication medium 130. In response to this notification, the electric vehicle 102 may switch from the secondary communication medium 132 to the primary communication medium 130. After the electric vehicle 102 responds (on the primary communication medium 130) to the message received from the charging station 112, the electric vehicle 102 can switch back to the secondary communication medium 132 and can continue to communicate with network devices of the remote PLC network 134.

Figure 4:
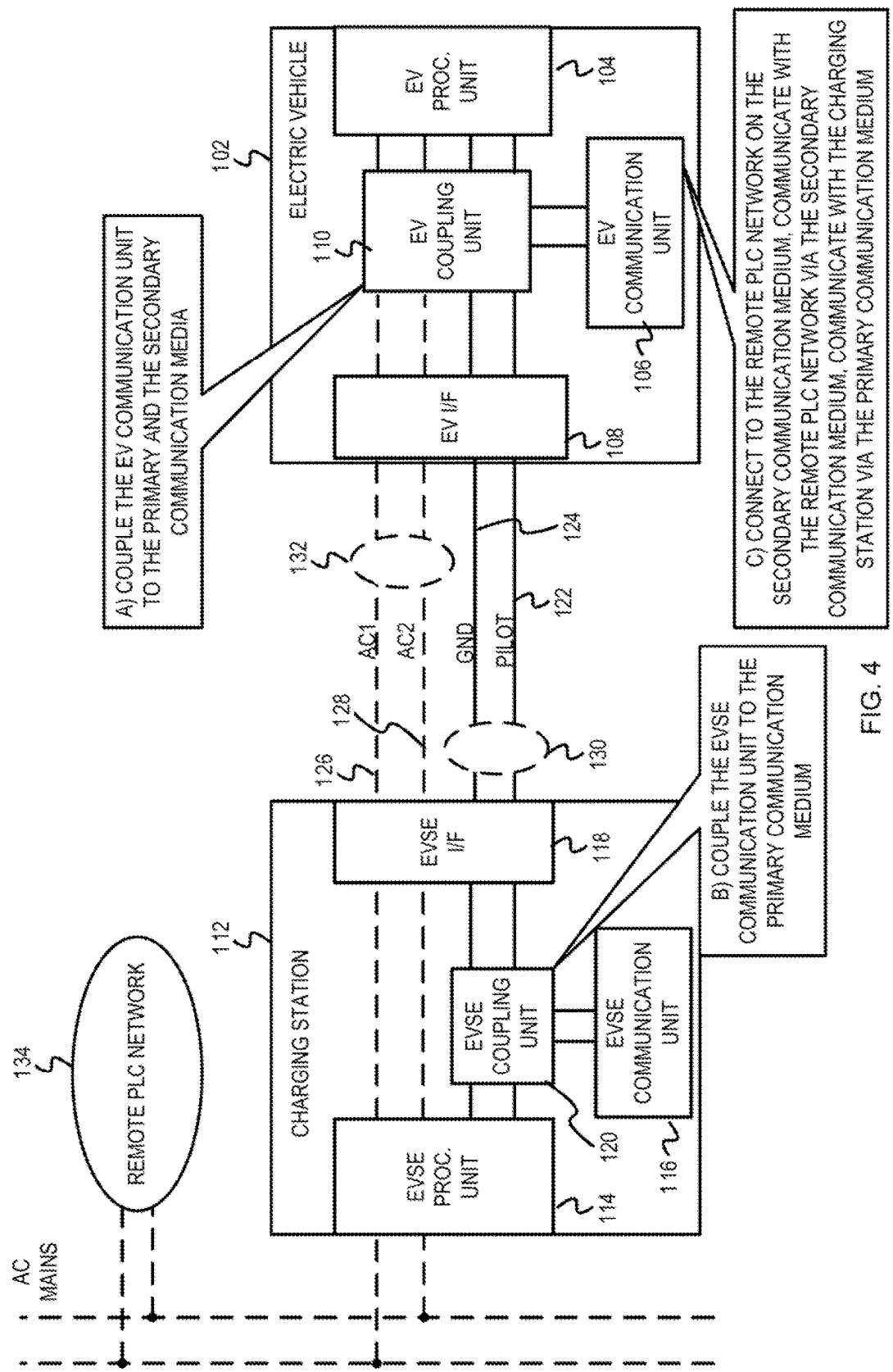
FIG. 4 is an example conceptual diagram illustrating another embodiment of an electric vehicle communication module switching to a new communication medium.

In some embodiments, as depicted in FIG. 3, the electric vehicle 102 may switch to the secondary communication medium 132 and may decouple from the primary communication medium 130. In this embodiment, when the EVSE communication unit 116 remains coupled to the primary communication medium 130, the charging station 112 may not be aware that the electric vehicle 102 is no longer coupled to the primary communication medium 130. Therefore, the charging station 112 may attempt to communicate with the electric vehicle 102 via the primary communication medium 130. In this embodiment, the electric vehicle 102 may not receive communications transmitted by the charging station 112 (e.g., the EVSE communication unit 116) on the primary communication medium 130, while the electric vehicle 102 is coupled with the secondary communication medium 132. Although, it may be possible for the electric vehicle 102 (e.g., the EV communication unit 106) to receive communications from the charging station 112 through indirect RF coupling, to ensure that the electric vehicle 102 receives the communications from the charging station 112 when the electric vehicle 102 is coupled with the secondary communication medium 132, the electric vehicle 102 may switch to a "combined communication medium." In other words, in some embodiments, as depicted in FIG. 4, after the association process is completed, the electric vehicle 102 (e.g., the EV communication unit 106) may switch to a new communication medium that is a combination of the primary communication medium 130 and the secondary communication medium 132. In the example of FIG. 4, the primary communication medium 130 (depicted by solid lines) is the physical medium formed by the pilot wire 122 and the ground wire 124; while the secondary communication medium 132 (depicted by dashed lines) is the physical medium formed by the AC1 wire 126 and the AC2 wire 128. In the example of FIG. 4, at stage A, only the electric vehicle 102 may be switched to the new communication medium (e.g., the combination of the primary communication medium 130 and the secondary communication medium 132). The EV coupling unit 110 couples the EV communication unit 106 to both the primary communication medium 130 (comprising the pilot wire 122 and the ground wire 124) and the secondary communication medium 132 (comprising the AC1 wire 126 and the AC2 wire 128). In the example of FIG. 4, the charging station 112 may remain coupled to the primary communication medium 130 (see stage B). The EVSE coupling unit 120 couples the EVSE communication unit 116 to the primary communication medium 130 comprising the pilot wire 122 and the ground wire 124. The EVSE coupling unit 120 does not couple the EVSE communication unit 116 to the AC1 wire 126 and the AC2 wire 128, indicating that the charging station 112 does not switch to the new communication medium. At stage C, the EV communication unit 106 can connect to the remote PLC network 134 on the secondary communication medium 132. As part of the remote PLC network 134, the EV communication unit 106 can communicate with one or more network devices of the remote PLC network 134 via the secondary communication medium (e.g., by transmitting and receiving packets on the AC1 and AC2 wires). The EV communication unit 106 may also (if needed) communicate with the charging station 112 (e.g., the EVSE communication unit 116) via the primary communication medium (e.g., by transmitting and receiving packets on the pilot and ground wires). By switching to the combined communication medium (e.g., by connecting to both the primary communication medium 130 and the secondary communication medium 132), as depicted in FIG. 4, the EV communication unit 106 can simultaneously satisfy both medium-related communications. In other words, by switching to the combined communication medium, the EV communication unit 106 can simultaneously communicate with the charging station 112 (on the pilot and ground wires) and with the remote PLC network 134 (on the AC1 and AC2 wires). In some embodiments, by switching to the combined communication medium, communications transmitted by the charging station 112 may be received on both the primary and the secondary communication media (e.g., on the pilot/ground wires and on the AC1/AC2 wires). Likewise, the electric vehicle 102 can transmit messages on both the primary and the secondary communication media.

Although FIGS. 3 and 4 describe the EV communication unit 106 switching to a new communication medium, while the EVSE communication unit 116 remains coupled only with the primary communication medium 130, embodiments are not so limited. In other embodiments, as will be further described with reference to FIGS. 5-6, the charging station 112 may be switched to a new communication medium (e.g., the secondary communication medium 132 or the combined communication medium), while the electric vehicle remains coupled with only the primary communication medium 130.

Figure 5:
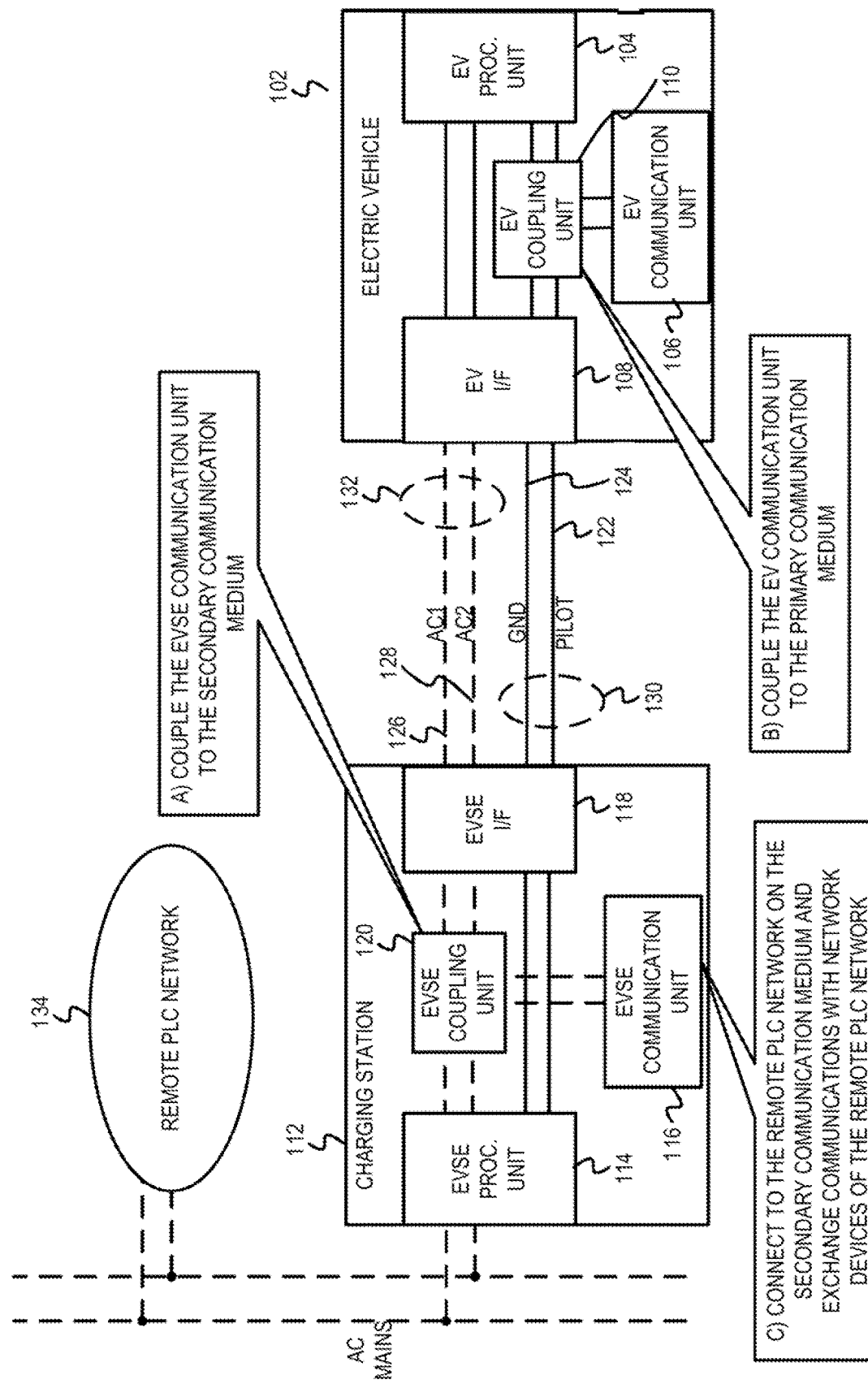
FIG. 5 is an example conceptual diagram illustrating one embodiment of a charging station communication module switching to a new communication medium.

FIG. 5 is an example conceptual diagram illustrating one embodiment of a charging station communication module switching to a new communication medium. In the example of FIG. 5, after associating with the electric vehicle 102, the EVSE communication unit 116 (or the EVSE coupling unit 120) can determine to switch the charging station 112 from the primary communication medium 130 to the secondary communication medium 132. In the example of FIG. 5, the primary communication medium 130 (i.e., the physical medium formed by the pilot wire 122 and the ground wire 124) is depicted by solid lines, while the secondary communication medium 132 (e.g., the physical medium formed by the AC1 wire 126 and the AC2 wire 128) is depicted by dashed lines. In the example of FIG. 5, at stage A, the EV communication unit 106 remains coupled to the primary communication medium 130 (and a local communication network comprising the charging station 112). The EV coupling unit 110 couples the EV communication unit 106 to the primary communication medium 130 comprising the pilot wire 122 and the ground wire 124. At stage B, the EVSE communication unit 116 is coupled with the secondary communication medium 132. The EVSE coupling unit 120 couples the EVSE communication unit 116 to the secondary communication medium 132 comprising the AC1 wire 126 and the AC2 wire 128. Furthermore, the secondary communication medium 132 also comprises the remote PLC network 134 (e.g., a HomePlug network). As discussed above, network devices in the remote PLC network 134 can exchange communications using the AC1 wire 126 and the AC2 wire 128. In one example, the remote PLC network 134 can be a public garage network. At stage C, after switching to the secondary communication medium 132, the charging station 112 (e.g., the EVSE communication unit 116) can join the remote PLC network 134 (e.g., by associating with a coordinating network device of the remote PLC network 134). The EVSE communication unit 116 can perform additional operations, such as communicating with a central coordinating device in a charging facility or a parking garage. For example, the EVSE communication unit 116 can connect to a gateway (of the remote PLC network 134) to authenticate the electric vehicle 102.

In some embodiments, as similarly described with reference to the EV communication unit 106, the EVSE communication unit 116 may determine when to switch from one communication medium to the other communication medium and may direct the EVSE coupling unit 120 to couple the EVSE communication unit 116 to the appropriate communication medium. In other embodiments, as similarly described with reference to the EV coupling unit 110, the EVSE coupling unit 120 may determine when the EVSE communication unit 116 should switch from one communication medium to the other communication medium and may accordingly couple the EVSE communication unit 116 to the appropriate communication medium. In some embodiments, the charging station 112 may switch to the secondary communication medium 132 if it is determined (e.g., based on a communication schedule associated with the electric vehicle 102) that the charging station 112 will not transmit (or receive) any communications to (or from) the electric vehicle 102. The charging station 112 may switch back to the primary communication medium 130 to transmit a message to the electric vehicle 102 or if the electric vehicle 102 is scheduled to transmit a message to the charging station 112. In other embodiments, the charging station 112 may receive a notification when the electric vehicle 102 transmits a message on the primary communication medium 130. In response to this notification, the charging station 112 may switch from the secondary communication medium 132 to the primary communication medium 130. After the charging station 112 responds to the received message from the electric vehicle 102, the charging station 112 can switch from the primary communication medium 130 to the secondary communication medium 132.

In some embodiments, as depicted in FIG. 5, the charging station 112 may switch to the secondary communication medium 132 and may decouple from the primary communication medium 130, while the electric vehicle 130 may remain coupled to the primary communication medium 130. If the charging station 112 does not notify the electric vehicle 102 when the charging station 112 switches to the secondary communication medium 130, the electric vehicle 102 may not be aware that the charging station 112 is not coupled with the primary communication medium 130. The electric vehicle 102 may attempt to communicate with the charging station 112 via the primary communication medium 130, even though the charging station 112 is not coupled with the primary communication medium 130. In this embodiment, the charging station 112 may not receive the communications transmitted by the electric vehicle 102 (e.g., the EV communication unit 106) on the primary communication medium 130. In some embodiments, the charging station 112 may detect communications from the electric vehicle 102 through indirect RF coupling of the primary communication medium 130 and the secondary communication medium 132. However, to ensure that the charging station 112 always receives the communications from the electric vehicle 102 (when the charging station 112 is coupled with the secondary communication medium 132), the charging station 112 (e.g., the EVSE communication unit 116) may be coupled with a combined communication medium (e.g., a combination of both the primary and the secondary communication media). As will be described with reference to FIG. 6, after the association process is completed, the charging station 112 (e.g., the EVSE communication unit 116) can switch to a new communication medium that is a combination of the primary communication medium 130 (e.g., formed by the pilot wire 122 and the ground wire 124 and depicted by solid lines) and the secondary communication medium 132 (e.g., formed by the AC1 wire 126 and the AC2 wire 128 and depicted by dashed lines).

Figure 6:
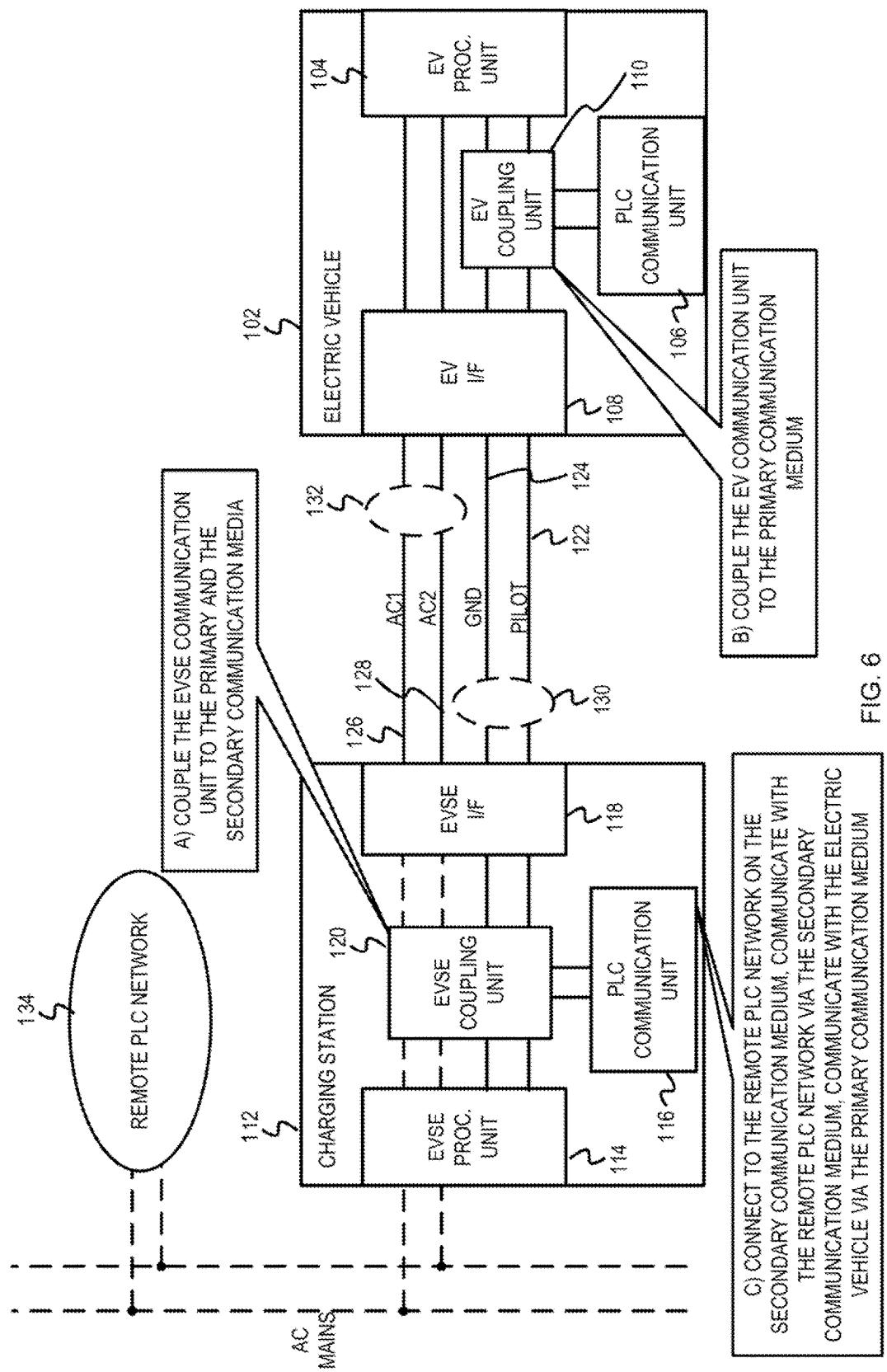
FIG. 6 is an example conceptual diagram illustrating another embodiment of a charging station communication module switching to a new communication medium.

As depicted in FIG. 6, at stage A, only the charging station 112 (e.g., the EVSE communication unit 116) is switched to the new communication medium (e.g., the combination of the primary communication medium 130 and the secondary communication medium 132). The EVSE coupling unit 120 couples the EVSE communication unit 116 to both the primary communication medium 130 (comprising the pilot wire 122 and the ground wire 124) and the secondary communication medium 132 (comprising the AC1 wire 126 and the AC2 wire 128). At stage B, the electric vehicle 102 (e.g., the EV communication unit 106) remains coupled to the primary communication medium 130 and does not switch to the new communication medium. The EV coupling unit 110 couples the EV communication unit 106 to the primary communication medium 130 comprising the pilot wire 122 and the ground wire 124. The EV coupling unit 110 does not couple the EV communication unit 106 to the AC1 wire 126 and the AC2 wire 128, indicating that the electric vehicle 102 does not switch to the new communication medium.

At stage C, the EVSE communication unit 116 connects to the remote PLC network 134 on the secondary communication medium 132. While connected to the remote PLC network 134, the EVSE communication unit 116 can communicate with one or more network devices (e.g., HomePlug AV devices) of the remote PLC network 134 by transmitting and receiving packets on the AC1 and AC2 wires. Also, because the new communication medium comprises the primary communication medium 130, the EVSE communication unit 116 can also (if needed) communicate with the electric vehicle 102 on the primary communication medium 130 by transmitting and receiving packets on the pilot and ground wires. By switching to the combined communication medium, as depicted in FIG. 6, the EVSE communication unit 116 can simultaneously satisfy both medium-related communications. In other words, by switching to the combined communication medium, the EVSE communication unit 116 can communicate with the electric vehicle 102 (using the primary communication medium 130) and can simultaneously communicate with the remote PLC network 134 (e.g., using the second communication medium 132). For example, the EVSE communication unit 116 may simultaneously communicate with the EV communication unit 106 (on the primary communication medium 130) and with a gateway of the PLC network 134 (on the secondary communication medium 132). In some embodiments, by switching to the combined communication medium, communications transmitted by the electric vehicle 102 may be received on both the primary and the secondary communication media (e.g., on the pilot/ground wires and on the AC1/AC2 wires). Likewise, the EVSE communication unit 116 can transmit messages on both the primary and the secondary communication media.

FIGS. 3-4 describe operations wherein only the EV communication unit 106 switches to a new communication medium, while the EVSE communication unit 116 remains coupled with the primary communication medium 130. FIGS. 5-6 describe operations wherein only the EVSE communication unit 116 switches to the new communication medium, while the EV communication unit 106 remains coupled with the primary communication medium 130. However, embodiments are not so limited. In other embodiments, as will be further described with reference to FIGS. 7-8, both the EV and the EVSE may simultaneously switch to a new communication medium (e.g., the secondary communication medium or the combined communication medium).

Figure 7:
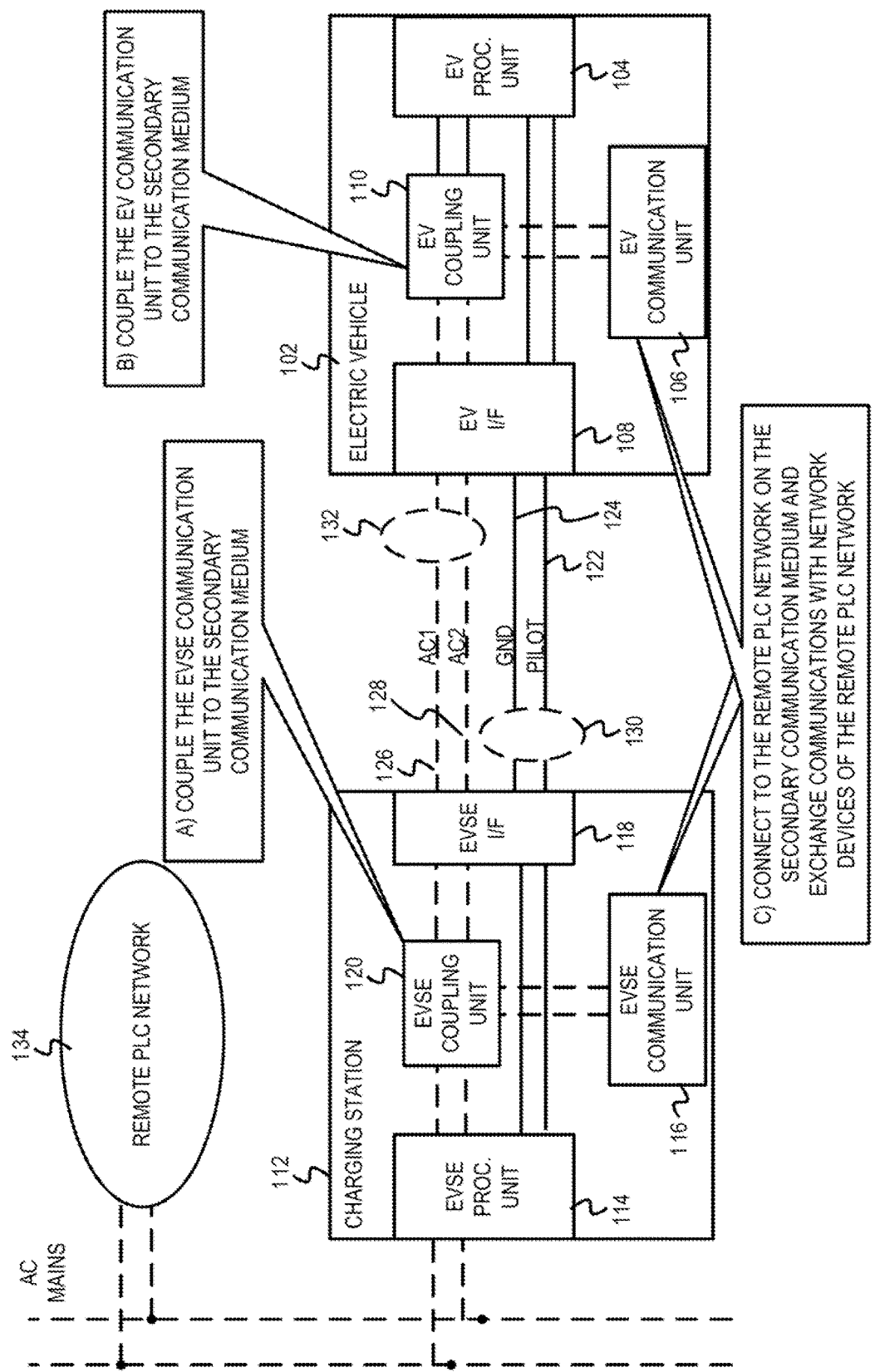
FIG. 7 is an example conceptual diagram illustrating one embodiment of an electric vehicle communication module and a charging station communication module both switching to a new communication medium.

FIG. 7 is an example conceptual diagram illustrating one embodiment of an electric vehicle communication module and a charging station communication module both switching to a new communication medium. In FIG. 7, the EV coupling unit 110 may initially couple the EV communication unit 106 with the primary communication medium 130 (e.g., formed by the pilot wire 122 and the ground wire 124). Likewise, the EVSE coupling unit 120 may initially couple the EVSE communication medium 116 to the primary communication medium 130. The EV communication unit 106 and the EVSE communication unit 116 may exchange one or more messages (on the primary communication medium 130) to associate with each other and validate the electric vehicle 102. After the EV-EVSE association process is successfully completed, the charging station 112 may start providing electric power to the electric vehicle 102 using the AC1 wire 126 and the AC2 wire 128. After the EV-EVSE association process is successfully completed, the electric vehicle 102 and the charging station 112 can determine to switch to a new communication medium. In the example of FIG. 7, the new communication medium is the secondary communication medium 132 formed by the AC1 wire 126 and the AC2 wire 128 (depicted by dashed lines) and is distinct from the primary communication medium 130. At stage A, the EV coupling unit 110 couples the electric vehicle 102 to the secondary communication medium 132 by coupling the EV communication unit 106 with the AC1 wire 126 and the AC2 wire 128. Likewise, at stage B, the EVSE coupling unit 120 couples can couple the charging station 112 to the secondary communication medium 132 by coupling the EVSE communication unit 116 with the AC1 wire 126 and the AC2 wire 128.

At stage C, after switching to the secondary communication medium 132, the EV communication unit 106 and the EVSE communication unit 116 can each connect to another PLC network on the secondary communication medium 132. As depicted in FIG. 7, the secondary communication medium 132 comprises the remote PLC network 134 (e.g., a HomePlug network). The remote PLC network 134 may be a home network, a parking garage network, or another suitable network. In some embodiments, the EV communication unit 106 and the EVSE communication unit 116 can connect to the same PLC network on the secondary communication medium 132. In other embodiments, the EV communication unit 106 and the EVSE communication unit 116 can each connect to different PLC networks on the secondary communication medium 132. When the electric vehicle 102 and the charging station 112 connect to the remote PLC network 134, the EV communication unit 106 and the EVSE communication unit 116 can transmit/receive messages on the AC1 wire 126 and the AC2 wire 128 to communicate with network devices of the remote PLC network 134. For example, the EV communication unit 106 can connect with a gateway of the remote PLC network 134 to synchronize information, download content, etc. The EVSE communication unit 116 can connect to the gateway of the remote PLC network 134 to authenticate the electric vehicle 102.

Figure 8:
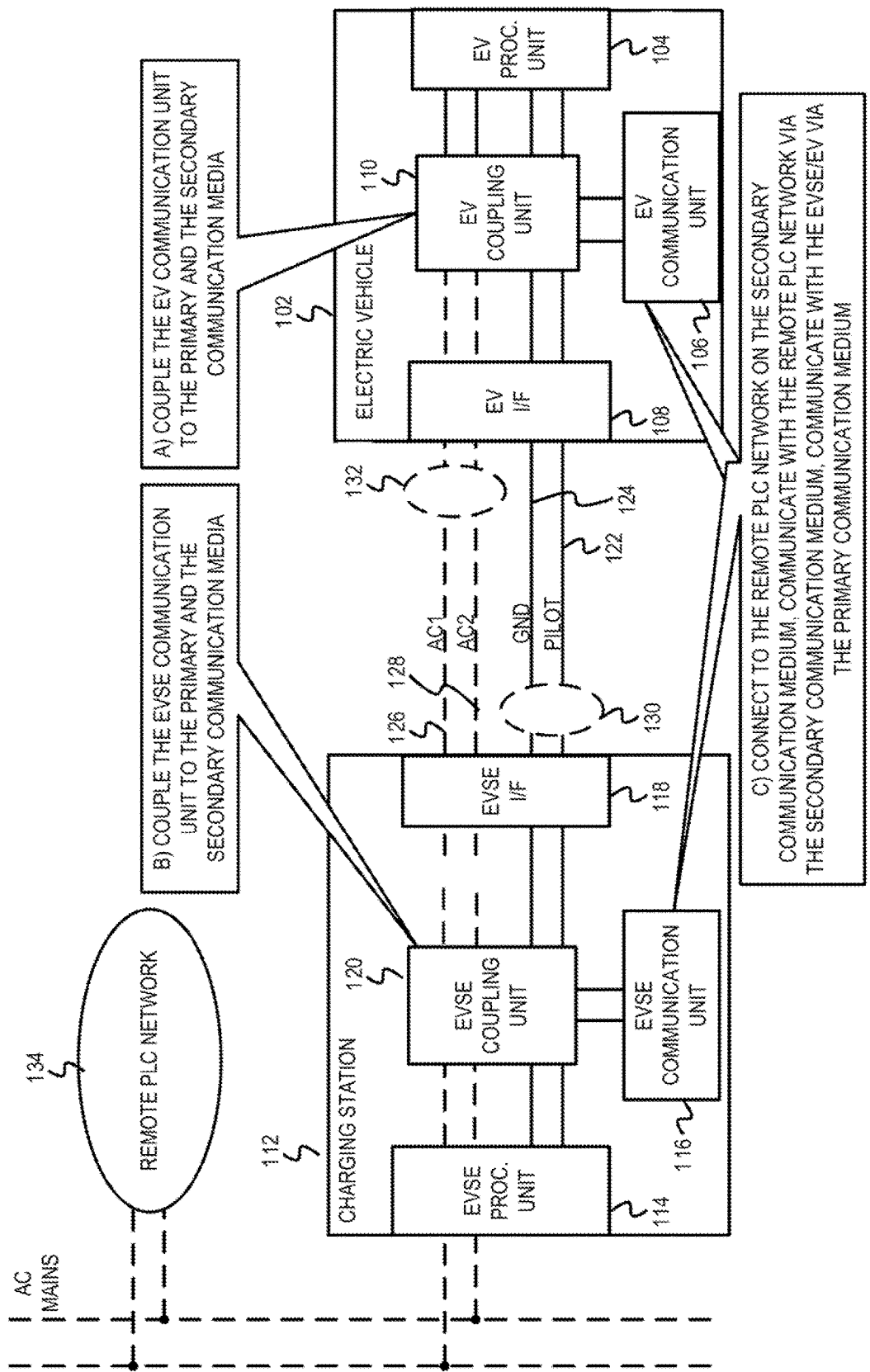
FIG. 8 is an example conceptual diagram illustrating another embodiment of an electric vehicle communication module and a charging station communication module both switching to a new communication medium.

However, when the EV communication unit 106 and the EVSE communication unit 116 both switch to the secondary communication medium 132 and decouple from the primary communication medium 130, the EV communication unit 106 and the EVSE communication unit 116 may not be able to communicate with each other (e.g., to exchange communications related to charging of the electric vehicle 102). Therefore, in some embodiments, as depicted in FIG. 8, the electric vehicle 102 and the charging station 112 can switch to a combined communication medium that is a combination of the primary communication medium 130 and the secondary communication medium 132. As discussed above, at stage A, the EV coupling unit 110 couples the electric vehicle 102 to the combined communication medium by coupling the EV communication unit 106 with the pilot wire 122, the ground wire 124, the AC1 wire 126, and the AC2 wire 128. Likewise, at stage B, the EVSE coupling unit 120 couples the charging station 112 to the combined communication medium by coupling the EVSE communication unit 116 with the pilot wire 122, the ground wire 124, the AC1 wire 126, and the AC2 wire 128. In FIG. 8, dashed lines are used to depict that the charging station 112 and the electric vehicle 102 are coupled to the secondary communication medium 132. At stage C, the EV communication unit 106 and the EVSE communication unit 116 can connect to one or more networks (e.g., the remote PLC network 134) on the secondary communication medium 132. By simultaneously connecting to the primary communication medium 130 and the secondary communication medium 132, the electric vehicle 102 and the charging station 112 can communicate with each other and also with other network devices in the remote PLC network 134. For example, the electric vehicle 102 and the charging station 112 may exchange messages related to EV charging (via the primary communication medium 130) and may, simultaneously, communicate (via the secondary communication medium 132) with a home network server or another suitable network device of the remote PLC network 134 to download maps, sync information, receive entertainment transmissions, etc.

Referring to FIGS. 7 and 8, in some embodiments, the electric vehicle 102 and the charging station 112 may execute one or more operations to coordinate when/how to switch to a new communication medium so that the EV communication unit 106 and the EVSE communication unit 116 can connect to the new communication medium at the same time. As discussed above, the new communication medium can be the secondary communication medium 132 or the combination of the primary and secondary communication media. The electric vehicle 102 (e.g., the EV coupling unit 110 and/or the EV communication unit 106) and the charging station 112 (e.g., the EVSE coupling unit 120 and/or the EVSE communication unit 116) may use a variety of techniques to coordinate when to switch to the new communication medium. For example, the electric vehicle 102 and the charging station 112 may switch to the new communication medium after the EV-EVSE association process is completed (e.g., after the electric vehicle 102 and the charging station 112 become part of the same logical network as described in the HomePlug GreenPHY specification). As another example, the charging station 112 may determine when to switch to the new communication medium. The charging station 112 may provide a notification to the electric vehicle 102 indicating when to switch to the new communication medium. The charging station 112 may indicate a time instant at which (or a time period after which) the electric vehicle 102 should switch to the new communication medium. The charging station 112 may provide the notification of when to switch to the new communication medium in a beacon message, a management message, or another suitable type of message. In some embodiments, the charging station 112 may provide this notification in multiple messages (e.g., multiple beacon messages or multiple management messages, etc.) to ensure that the electric vehicle 102 receives the notification and switches to the new communication medium at the appropriate time instant. As another example, the electric vehicle 102 may determine when to switch to the new communication medium and may accordingly notify the charging station 112 of a time instant at (or a time period after) which to switch to the new communication medium. It is noted that the electric vehicle 102 and the charging station 112 may use other suitable techniques to coordinate when to switch to the new communication medium. It is noted that in other embodiments, the electric vehicle 102 and the charging station 112 may independently switch to the secondary communication medium 132 without notifying the other network device of the switch to the secondary communication medium 132.

Although FIGS. 3-8 depict the electric vehicle 102 and the charging station 112 executing operations at different stages (e.g., stages A, B, and C), it is noted that the operations described with reference to FIGS. 3-8 may not be sequential. It is noted that the operations are assigned to different stages in FIGS. 3-8 for easy reference and clarity. It is noted that although examples refer to the primary communication medium 130 comprising the physical medium formed by the pilot wire 122 and the ground wire 124 and the secondary communication medium 132 comprising the physical medium formed by the AC1 wire 126 and the AC2 wire 128, embodiments are not so limited. In other embodiments, the primary and/or the secondary communication media can be formed using other suitable combinations of wires. For example, the primary or the secondary communication medium may comprise: 1) the AC1 wire 126 and the ground wire 124, or 2) the AC2 wire 128 and the ground wire 124, etc.

Figure 9:
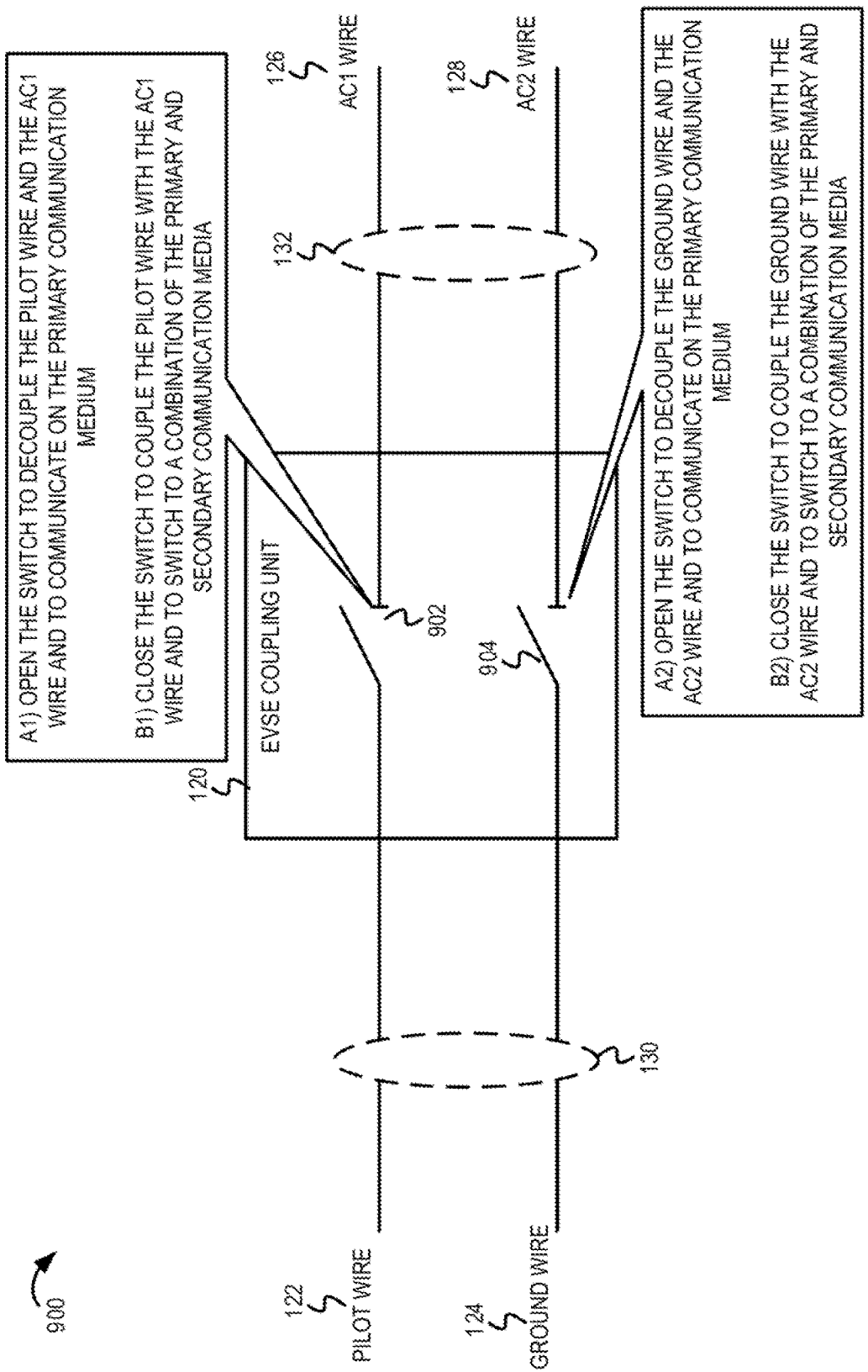
FIG. 9 is a conceptual diagram including an example mechanism for coupling signals from one communication medium to another communication medium.

FIGS. 3-8 describe operations for the electric vehicle 102 and/or the charging station 112 switching from the primary communication medium to a new communication medium (e.g., a secondary communication medium 132 that is distinct from the primary communication medium 130 or a combination of the primary and the secondary communication media). FIG. 9 will now describe an example mechanism for coupling signals from one communication medium to another communication medium.

In some implementations, as part of switching to the combined communication medium (e.g., a physical medium comprising a combination of the pilot wire 122, the ground wire 124, the AC1 wire 126, and the AC2 wire 128), the EVSE coupling unit 120 may comprise a mechanism for coupling signals transmitted on the pilot and ground wires on to the AC mains to allow the electric vehicle 102 and/or the charging station 112 to communicate with other PLC devices (e.g., in the remote PLC network 134 on the secondary communication medium 132). FIG. 9 is an example embodiment for coupling signals on the pilot wire 122 onto the AC mains. In other words, the physical medium comprising the pilot wire 122 and the ground wire 124 (e.g., the primary communication medium 130) can be coupled on to the physical medium comprising the AC1 wire 126 and the AC2 wire 128 (or the AC1 and neutral wires) using the EVSE coupling unit 120. In the example of FIG. 9, the EVSE coupling unit 120 comprises switches 902 and 904. The switch 902 couples the pilot wire 122 with the AC1 wire 126 while the switch 904 couples the ground wire 124 with the AC2 wire 128.

Referring to FIG. 9, at stages A1 and A2, when the switches 902 and 904 are open (e.g., the switches 902 and 904 are in an OFF state), the signals on pilot and ground wires are mostly confined to the charging harness and are used for exchanging information between the electric vehicle 102 and charging station 112 (on the primary communication medium 130) to execute the charging process. When the switches 902 and 904 are in the OFF state, a small portion of the signal on the pilot and the ground wires (e.g., the primary communication medium 130) may be coupled to the AC1 and AC2 wires (e.g., the secondary communication medium 132) due to RF coupling. However, the strength of the signal on the AC1 and AC2 wires is typically too small and negligible to be received by other PLC devices (e.g., in the remote PLC network 134 connected to the AC1 and AC2 wires), thus limiting the ability to communicate with other PLC devices on the AC1 and AC2 wires. At stages B1 and B2, when the switches 902 and 904 are closed (e.g., the switches 902 and 904 are in an ON state), the pilot wire 122 and the ground wire 124 are coupled with the AC1 wire 126 and the AC2 wire 128 respectively. Therefore, signals transmitted on the pilot and ground wires can propagate on the AC1 and AC2 wires with minimal attenuation. This can enable the electric vehicle 102 and/or the charging station 112 to communicate with other PLC devices in the remote PLC network 134 connected to the AC1 and AC2 wires (e.g., on the secondary communication medium 132). In some embodiments, the EVSE coupling unit 120 may not close the switches 902 and 904 until the EV-EVSE association process is completed and the electric vehicle 102 begins to receive electric power from the charging station 112. After the EV-EVSE association process is complete, the EVSE coupling unit 112 may close the switches 902 and 904 to enable electric vehicle 102 and/or the charging station 112 to communicate with other PLC devices in the remote PLC network 134 connected to the AC1 and AC2 wires.

It is noted that in some embodiments, after pilot and ground wires are coupled to the AC1 and AC2 wires, the electric vehicle 102 (and/or the charging station 112) may continue to communicate on both the communication media 130 and 132. In other words, any communications transmitted on the pilot and ground wires may also be transmitted on the AC1 and AC2 wires. Likewise, any communications transmitted on the AC1 and AC2 wires may also be transmitted on the pilot and ground wires. In other embodiments, however, the electric vehicle 102 (and/or the charging station 112) may stop communicating on the pilot and ground wires and may only communicate on the AC1 and AC2 wires. Although FIG. 9 depicts an example embodiment of the EVSE coupling unit 120, in other embodiments, the EV coupling unit 110 may implement the same (or similar) coupling mechanism. In some embodiments, the EV coupling unit 110 and the EVSE coupling unit 120 may coordinate when to close/open their respective switches. In other embodiments, the EV coupling unit 110 and the EVSE coupling unit 120 may close/open their respective switches independent of each other. In other embodiments, only the EV coupling unit 110 may close its switches while the EVSE coupling unit 120 may leave its switches open. In another embodiment, only the EVSE coupling unit 120 may close its switches, while the EV coupling unit 110 may leave its switches open.

Figure 10:
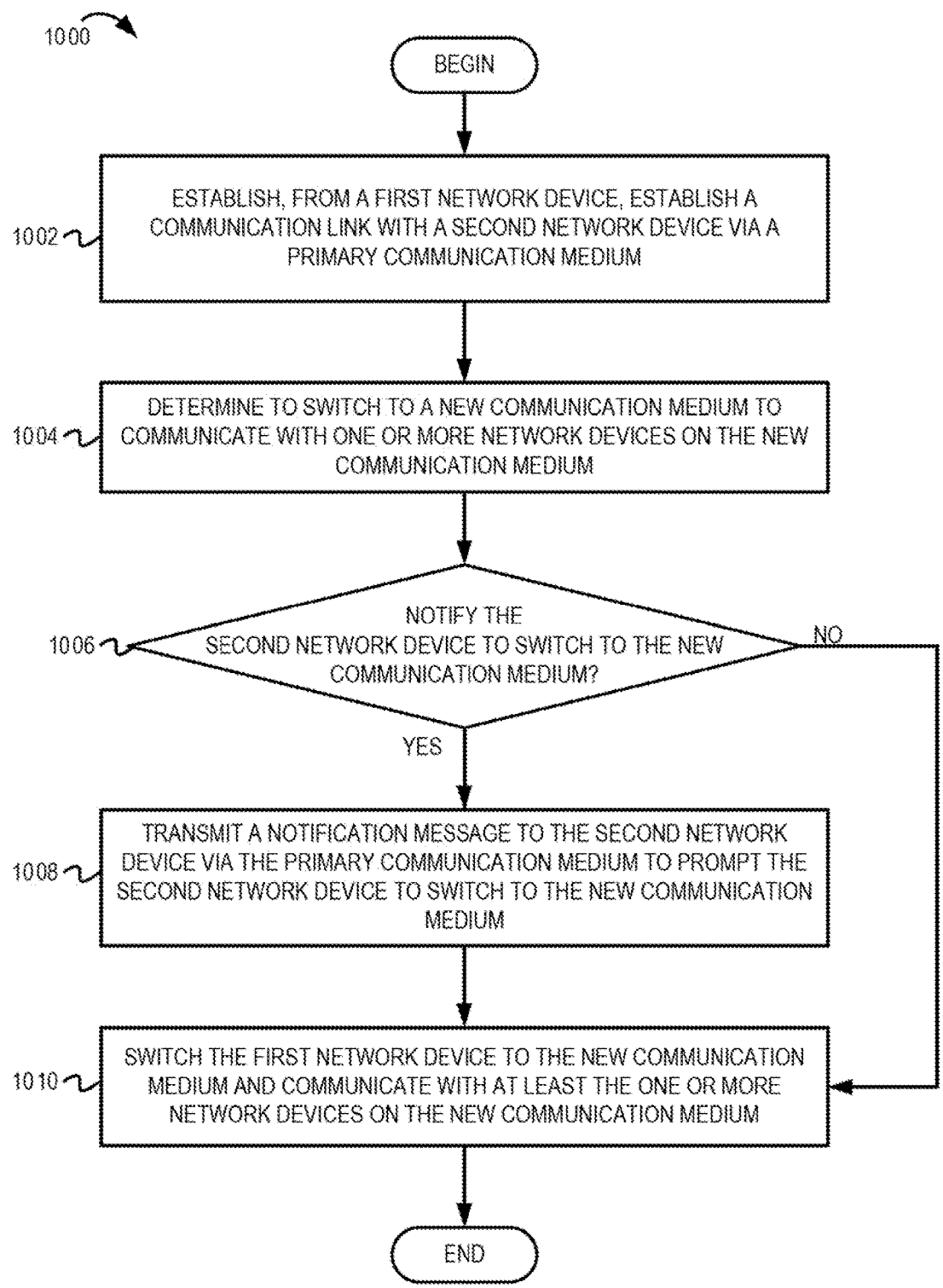
FIG. 10 is a flow diagram illustrating example operations for switching to a new communication medium.

FIG. 10 is a flow diagram ("flow") 1000 illustrating example operations for switching to a new communication medium. The flow begins at block 1002.

At block 1002, a first network device communicates with a second network device via a primary communication medium and establishes a communication link with the second network device. Referring to FIG. 1, a charging station 112 (e.g., the EVSE communication unit 116) can communicate with an electric vehicle 102 (e.g., the EV communication unit 106) via the primary communication medium 130 formed by the pilot wire 122 and the ground wire 124. The EVSE communication unit 116 and the EV communication unit 106 can exchange one or more messages to execute an EV-EVSE association process. After the EV-EVSE association process is successfully completed, the EVSE communication unit 116 and the EV communication unit 106 can establish a communication link on the primary communication medium and the electric vehicle 102 can begin to receive electric power from the charging station 112. In some embodiments, after the EV-EVSE association process is successfully completed, the electric vehicle 102 and the charging station 112 can also form a local network on the primary communication medium 130. The flow continues at block 1004.

At block 1004, the first network device determines to switch to a new communication medium to communicate with one or more network devices on the new communication medium. As discussed above, in some embodiments, the new communication medium can be a secondary communication medium 132 (formed by the AC1 wire 126 and the AC2 wire 128) and may be distinct from the primary communication medium 132. In other embodiments, the new communication medium can be a combined communication medium that is a combination of the primary communication medium 130 and the secondary communication medium 132 (e.g., a combination of the pilot wire 122, the ground wire 124, the AC1 wire 126, and the AC2 wire 128). In one example, the electric vehicle 102 (e.g., the EV coupling unit 110 and/or the EV communication unit 106) can determine to switch to the new communication medium. In another example, the charging station 112 (e.g., the EVSE coupling unit 120 and/or the EVSE communication unit 116) can determine to switch to the new communication medium. The flow continues at block 1006.

At block 1006, it is determined whether to notify the second network device to switch to the new communication medium. For example, if the electric vehicle 102 determines to switch to the new communication medium, the electric vehicle 102 can determine whether to prompt the charging station 112 to switch to the new communication medium. As another example, if the charging station 112 determines to switch to the new communication medium, the charging station 112 can determine whether to prompt the electric vehicle 102 to switch to the new communication medium. If the first network device determines to notify the second network device to switch to the new communication medium, the flow continues at block 1008. Otherwise, if the first network device determines not to notify the second network device to switch to the new communication medium, the flow continues at block 1010.

At block 1008, the first network device transmits a notification message to the second network device via the primary communication medium to prompt the second network device to switch to the new communication medium. The flow 1000 moves from block 1006 to block 1008 if the first network device determines to prompt the second network device to switch to the new communication medium. For example, the charging station 112 (e.g., the EVSE coupling unit 120 and/or the EVSE communication unit 116) can determine a time instant at which (or a time period after which) the charging station 112 will switch to the new communication medium. The EVSE communication unit 116 can then transmit a notification message to the electric vehicle 102 on the primary communication medium 130 (e.g., on the pilot and ground wires). The notification message can indicate the time instant at which the EVSE communication unit 116 will couple with the new communication medium. The notification message may also serve to prompt the EV communication unit 106 to couple with the new communication medium at the same time instant. The notification message may be transmitted as part of a beacon frame, a management frame, or another suitable frame. As another example, the electric vehicle 102 may determine when to switch to the new communication medium and may transmit a notification message to prompt the charging station 112 to switch to the new communication medium. The flow continues at block 1010.

At block 1010, the first network device switches to the new communication medium and communicates with at least the one or more network devices on the new communication medium. In one example, as discussed above, the EVSE coupling unit 120 can couple the EVSE communication unit 116 to the new communication medium. If the new communication medium is the secondary communication medium 132 (that is distinct from the primary communication medium), the EVSE communication unit 116 can join a remote communication network (e.g., the remote PLC network 134) on the secondary communication medium 134 and can communicate with network devices of the remote communication network. If the new communication medium is a combined communication medium (e.g., a combination of the primary and the secondary communication media), the EVSE communication unit 120 can simultaneously communicate with the network devices of the remote communication network (via the secondary communication medium 134) and the electric vehicle 102 (via the primary communication medium 130). As another example, the EV coupling unit 110 can couple the EV communication unit 106 to the new communication medium. Depending on the new communication medium, the EV communication unit 106 may: 1) only communicate with network devices of a remote communication network (via the secondary communication medium 132), or 2) simultaneously communicate with the network devices of the remote communication network (via the secondary communication medium 134) and the charging station 112 (via the primary communication medium 130). From block 1010, the flow ends.

Figure 11:
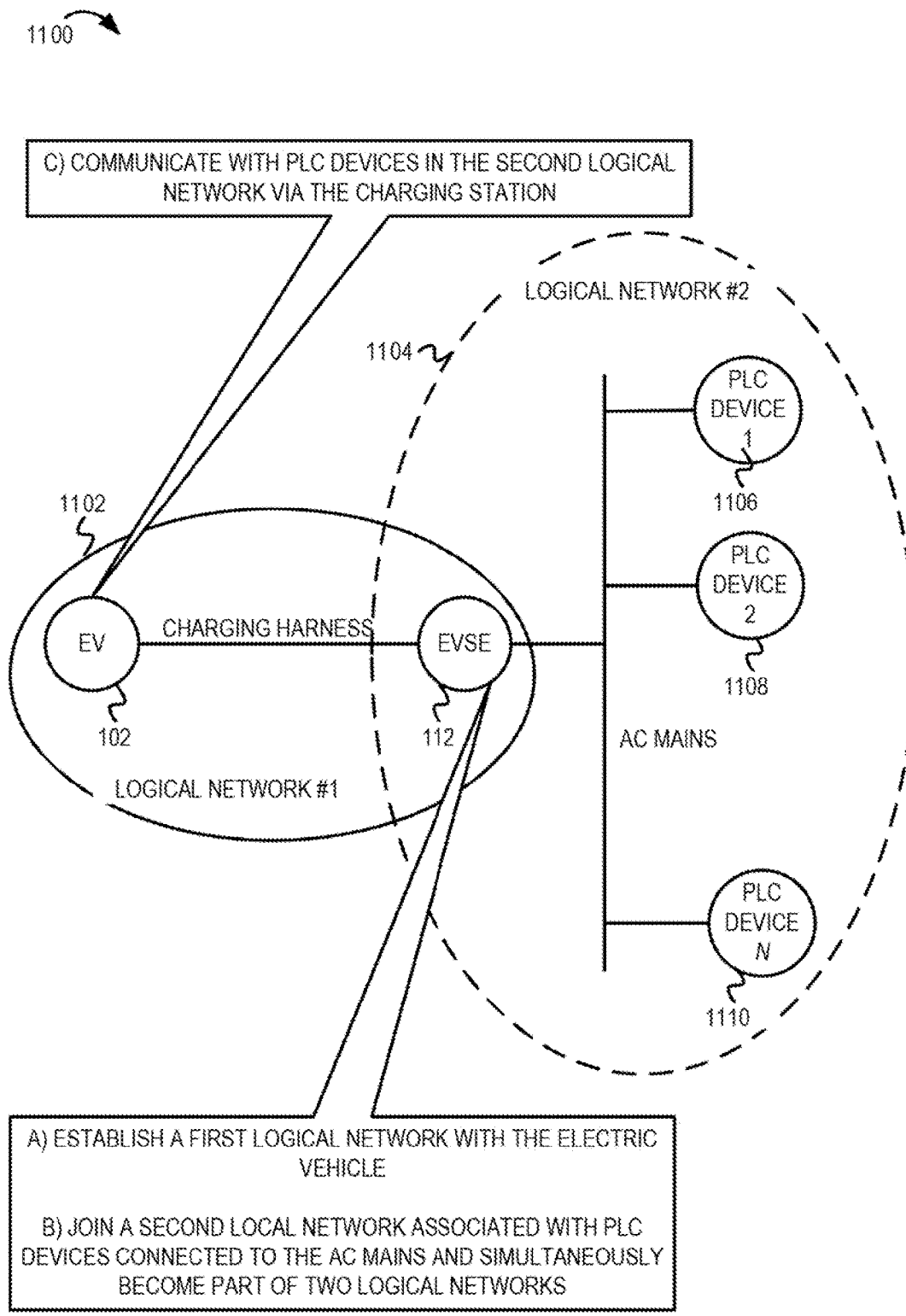
FIG. 11 is an example conceptual diagram illustrating the charging station joining two logical networks for simultaneous communication on two communication media.

Powerline communication (PLC) systems typically use encryption techniques to ensure that PLC devices that are not part of the same logical network (or security domain) do not receive transmissions exchanged within that logical network (or security domain). In accordance with the EV-EVSE association procedure (for charging the electric vehicle 102), the electric vehicle 102 and the charging station 112 may form a separate logical network 1102. However, to communicate with PLC devices on the secondary communication medium (e.g., PLC devices 1106, 1108, and/or 1110 connected to the AC mains), the electric vehicle 102 and/or the charging station 112 may need to become part of the logical network 1104 associated with the PLC devices 1106, 1108, and 1110. In one embodiment, the charging station 112 (e.g., the EVSE communication unit 116) may simultaneously become part of two or more logical networks. For example, as depicted in FIG. 11, at stage A, the charging station 112 may establish a first logical network 1102 with the electric vehicle 102 (during the EV-EVSE association procedure). While remaining a part of the first logical network 1102 with the electric vehicle 102, the charging station 112 may also become part of a second logical network 1104 associated with the PLC devices 1106, 1108, and 1110 connected to the AC mains (see stage B). In FIG. 11, the second logical network 1104 comprises the PLC devices 1106, 1108, and 1110 and the charging station 112. In the example of FIG. 11, the charging station 112 may operate as a repeater (or router) to enable the electric vehicle 102 to communicate with the PLC devices 1106, 1108, and 1110 connected to the AC mains (e.g., on the secondary communication medium). In other words, the electric vehicle 102 may communicate with the PLC device 1110 (e.g., that provides access to the Internet) through the charging station 112 (see stage C). In this embodiment, the electric vehicle 102 may communicate with the PLC devices 1106, 1108, and 1110 of the second logical network 1104 even though the electric vehicle 102 is not directly part of (and does not have the security credentials of) the second logical network 1104.

It is noted that in another embodiment, the electric vehicle 102 may become part of two or more logical networks. For example, the electric vehicle 102 may maintain the first logical network 1102 with the charging station 112 and may simultaneously become part of the second logical network 1104 associated with one or more PLC devices 1106, 1108, and 1110 connected to the AC mains. In another embodiment, the electric vehicle 102 and the charging station 112 may form the first logical network 1102 during the EV-EVSE association procedure. However, in response to determining to switch to the secondary communication medium, the electric vehicle 102 and the charging station 112 may relinquish (or leave) the previously established logical network 1102 and may join the second logical network 1104 associated with the PLC devices 1106, 1108, and 1110 connected to the AC mains. This embodiment can simplify the implementation of the electric vehicle 102 and the charging station 112 because they need not be configured to simultaneously join two distinct logical networks. In one example of this embodiment, the electric vehicle 102 and the charging station 112 may coordinate the time at which they relinquish the previously established logical network 1102 and join the second logical network 1104 associated with the PLC devices 1106, 1108, and 1110 connected to the AC mains. In another example of this embodiment, the charging station 112 may determine when to switch to the second logical network 1104 and may accordingly notify the electric vehicle 102 in a beacon message, a management message, or another suitable message.

In some embodiments, to join the second logical network 1104 associated with the PLC devices 1106, 1108, and 1110 connected to the AC mains, the electric vehicle 102 and the charging station 112 may need one or more security credentials (e.g., secret password or secret key) associated with the second logical network 1104. The electric vehicle 102 and/or the charging station 112 can employ a variety of techniques for obtaining the security credentials associated with the second logical network 1104. In one embodiment, the charging station 112 may be a part of the powerline network infrastructure and may have apriori knowledge of the security credentials associated with the second logical network 1104. For example, the security credentials associated with the second logical network 1104 may be stored in a predetermined memory location associated with the charging station 112. In this embodiment, after the EV-EVSE association process is successfully completed, the charging station 112 may access the security credentials from the predetermined memory location and provide these security credentials to the electric vehicle 102, so that the electric vehicle 102 can join the second logical network 1104. In another embodiment, a PLC device (e.g., the PLC device 1110) connected to the AC mains may authenticate the charging station 112 and may provide the security credentials of the second logical network 1104 to the charging station 112. The charging station 112, in turn, may provide the security credentials to the electric vehicle 102, so that both the electric vehicle 102 and the charging station 112 can join the second logical network 1104.

It should be understood that FIGS. 1-11 and the operations described herein are examples meant to aid in understanding embodiments and should not be used to limit embodiments or limit scope of the claims. Embodiments may perform additional operations, fewer operations, operations in a different order, operations in parallel, and some operations differently. For example, although embodiments disclose operations for switching an electric vehicle (EV) between two or more communication networks, embodiments are not so limited. In other embodiments, the operations described herein can also be extended to plug-in hybrid vehicles (PHV) and other suitable types of vehicles and electronic devices that can utilize a service or communicate via multiple communication media as described herein.

It is noted that although FIG. 9 depicts the EVSE coupling unit 120 comprising switches to couple the pilot and ground wires to the AC1 and AC2 wires respectively, embodiments are not so limited. In other embodiments, the EVSE coupling unit 120 may employ other coupling mechanisms in addition to (or instead of) the switches 902 and 904. For example, the EVSE coupling unit 120 can comprise one or more filters to ensure that only powerline signals (e.g., signals in the 2 MHz-30 MHz band) are coupled from the pilot and ground wires to the AC1 and AC2 wires. It is also noted that although FIG. 9 describes the pilot and ground wires being coupled to the AC1 and AC2 wires to switch the charging station 112 to the new communication medium, embodiments are not so limited. In other embodiments, the pilot and ground wires can be coupled to other suitable wires depending on the powerline communication network to which the charging station (and/or the electric vehicle 102) will connect.

Although FIG. 9 describes the EVSE coupling unit 120, in some embodiments, the EV coupling unit 110 can also be implemented similarly. In some embodiments, either the electric vehicle 102 or the charging station 112 can control when the primary communication medium 130 is coupled to the secondary communication medium 132 (e.g., the switches 902 and 904 are closed). In other embodiments, the electric vehicle 102 and the charging unit 112, in conjunction, can determine when to couple the primary communication medium 130 to the secondary communication medium 132. In some embodiments, only the charging station 112 may comprise a coupling unit (while the electric vehicle 102 may not comprise a coupling unit). In this embodiment, the charging station 112 can control when to couple the primary communication medium 130 and the secondary communication medium 132 and, accordingly, can notify the electric vehicle 102. In other embodiments, only the electric vehicle 102 may comprise a coupling unit (while the charging station 112 may not comprise a coupling unit). In this embodiment, the electric vehicle 102 can control when to couple the primary communication medium 130 with the secondary communication medium 132 and can notify the charging station 112 accordingly.

In some embodiments, the electric vehicle 102 and the charging station 112 may use a low transmit power while executing the EV-EVSE association procedure on the primary communication medium 130. After the EV-EVSE association procedure is completed and the electric vehicle 102 (and/or the charging station 112) switches to the new communication medium, the electric vehicle 102 (and/or the charging station 112) may use a higher transmit power. Using a higher transmit power to communicate on the secondary communication medium 132 can enable the PLC devices (connected to the secondary communication medium 132) to receive the PLC signal from the electric vehicle 102 (and/or the charging station 112) more reliably. In some embodiments, the electric vehicle 102 and the charging station 112 may coordinate the time at which to increase the transmit power. The electric vehicle 102 and the charging station 112 can employ a variety of techniques to coordinate the increase in the transmit power. In one embodiment, the electric vehicle 102 and the charging station 112 may switch to the higher transmit power after the EV-EVSE association process is completed (e.g., after the electric vehicle 102 and the charging station 112 join the same logical network as a last step in the EV-EVSE association process as described in HomePlug Green PHY specification). In another embodiment, the charging station 112 may provide a notification to the electric vehicle 102 indicating a time instant at which (or a time interval after which) the electric vehicle 102 should increase the transmit power. In this embodiment, the charging station 112 may transmit this notification in a beacon message, a management message, or another suitable type of message. In some embodiments, the notification can also indicate by how much to increase the transmit power. For example, the notification may indicate that the electric vehicle 102 (and/or the charging station 112) should transmit at a maximum transmit power. As another example, the notification may indicate that the electric vehicle 102 (and/or the charging station 112) should increase the transmit power by, for example, 5 dB. It is noted that in other embodiments, the electric vehicle 102 and the charging station 112 can employ other suitable techniques for determining when to switch to the higher transmit power and for coordinating the switch to the higher transmit power.

Although in some embodiments, after the primary and the secondary communication media are coupled together, the electric vehicle 102 (and/or the charging station 112) may continue to communicate on both the communication media, such that any communications transmitted on one communication medium are also transmitted on the other communication medium, embodiments are not so limited. In other embodiments, the electric vehicle 102 (and/or the charging station 112) may transmit different types of signals on the two communication media. The electric vehicle 102 and the charging station 112 may transmit a first type of messages via the primary communication medium 130 and may transmit a second type of messages via the secondary communication medium 132. The electric vehicle 102 and the charging station 112 may use a first transmit power level to transmit the first type of messages and may use a second transmit power level (which may be higher than the first transmit power level) to transmit the second type of messages. The electric vehicle 102 and the charging station 112 can each interface to the primary and the secondary communication media and can independently transmit their respective signals based on their respective communication schedules.

In some embodiments, the electric vehicle 102 and the charging station 112 may determine (e.g., based on apriori knowledge or based on exchanging negotiation messages) which wires should be used for internal communications (e.g., communications between the electric vehicle 102 and the charging station 112) and which wires should be used for external communications (e.g., to communicate with other PLC devices in a remote PLC network). In some embodiments, the electric vehicle 102 can communicate with the other PLC devices via the charging station 112, as discussed above with reference to FIG. 11. In this embodiment, the charging station 112 can receive a message from the electric vehicle 102, determine whether the received message is an internal communication or an external communication (e.g., based on the content of the message, a format of the message, wires on which the message was received, etc.), and can accordingly determine whether to process the message or transmit the message to the PLC devices in the remote PLC network. It is also noted that although FIGS. 4, 6, and 8 describe the combined communication medium comprising a combination of two communication media—the primary communication medium 130 (formed by the pilot and ground wires) and the secondary communication medium 132 (formed by the AC1 and AC2 wires), embodiments are not so limited. In other embodiments, the combined communication medium may be a combination of any suitable number of constituent communication media. For example, the combined communication medium may be a combination of three constituent communication media—a first medium formed by the pilot and ground wires, a second medium formed by the AC1 and ground wires, and a third medium formed by the AC2 and ground wires. In this example, the electric vehicle 102 and the charging station 112 can communicate with each other (using the pilot and ground wires), a first remote PLC network (using the AC1 and ground wires), and a second remote PLC network (using the AC2 and ground wires).

Although the Figures describe that the electric vehicle 102 and/or the charging station 112 use the secondary communication medium 132 to communicate with PLC devices in the remote PLC network 134 (e.g., connected to the wires that form the secondary communication medium 132), embodiments are not so limited. In other embodiments, the electric vehicle 102 and/or the charging station 112 may connect to any suitable type of communication network and may communicate with any suitable type of network device. For example, while the electric vehicle 102 charging process is ongoing, the electric vehicle 102 and/or the charging station 112 may access information on the Internet via the gateway of the remote PLC network 134 on the secondary communication medium 134. As another example, the charging station 112 may comprise functionality for connecting to a cellular network. In this example, the charging station 112 may be a gateway to the cellular network. The electric vehicle 102 (and/or other charging stations in the charging facility) can connect to the gateway charging station 112 to communicate with the cellular network.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
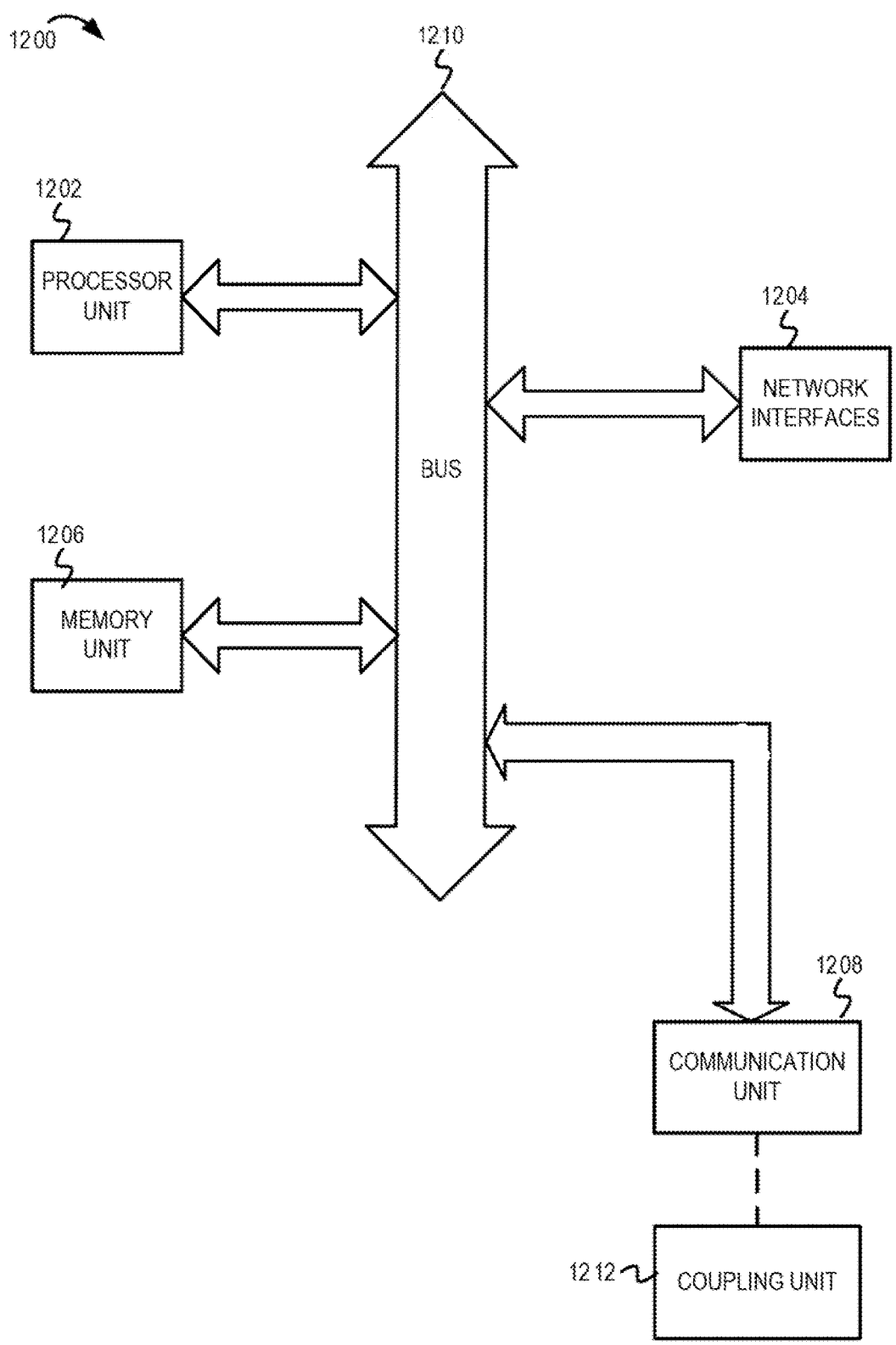
FIG. 12 is a block diagram of one embodiment of a system including a mechanism for switching to a new communication medium.

FIG. 12 is a block diagram of one embodiment of a system 1200 including a mechanism for switching to a new communication medium. In some embodiments, the system 1200 can be an electric vehicle that connects to a charging station in a charging facility to receive electric power. In another embodiment, the system 1200 can be a charging station that authenticates and provides electric power to an electric vehicle. The system 1200 includes a processor unit 1202 (possibly including multiple processors, multiple cores, multiple nodes, and/or implementing multi-threading, etc.). The system 1200 includes a memory unit 1206. The memory unit 1206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The system 1200 also includes a bus 1210 (e.g., PCI, ISA, PCI-Express, HyperTransport®, InfiniBand®, NuBus, AHB, AXI, etc.), and network interfaces 1204 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The system 1200 also includes a communication unit 1208 coupled with a coupling unit 1212. The system 1200, initially, can establish a communication link with a second system via a primary communication medium. After this communication link is established, the communication unit 1208 and the coupling unit 1212 can operate in conjunction to determine whether to switch to a new communication medium. As discussed above with reference to FIGS. 1-11, the new communication medium can be a secondary communication medium that is distinct from the primary communication medium or can be a combined communication medium (e.g., a combination of the primary and the secondary communication media). After switching to the new communication medium, the system 1200 can communicate with one or more network devices connected to the secondary communication medium. Any one of these functionalities may be partially (or entirely) implemented in hardware and/or on the processor unit 1202. For example, the functionality may be implemented with an application specific integrated circuit, in logic implemented in the processor unit 1202, in a co-processor on a peripheral device or card, etc. Further, realizations may include fewer or additional components not illustrated in FIG. 12 (e.g., video cards, audio cards, additional network interfaces, peripheral devices, etc.). For example, the communication unit 1208 may comprise one or more additional processors that are distinct from the processor unit 1202 coupled with the bus 1210. The processor unit 1202, the memory unit 1206, and the network interfaces 1204 are coupled to the bus 1210. Although illustrated as being coupled to the bus 1210, the memory unit 1206 may be coupled to the processor unit 1202.

While the embodiments are described with reference to various implementations and exploitations, it will be understood that these embodiments are illustrative and that the scope of the inventive subject matter is not limited to them. In general, techniques for switching communication devices between different communication media as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of network communication, the method comprising:
   establishing, via a first communication medium, a first communication link between a service provider device of a local communication network and an electric vehicle;
   providing power from the service provider device to the electric vehicle via a powerline medium after establishing the first communication link;
   communicatively coupling the service provider device to a remote communication network via the powerline medium; and
   establishing, via the powerline medium, a second communication link between the service provider device and the electric vehicle, wherein the second communication link is usable by the electric vehicle to communicate with a network device of the remote communication network.

2. The method of claim 1, wherein said establishing the first communication link comprises:
   communicating, from the service provider device, a first frame with the electric vehicle via the first communication medium.

3. The method of claim 1, wherein said communicatively coupling the service provider device to the remote communication network comprises:
   communicating, from the service provider device, a second frame to the network device of the remote communication network via the powerline medium.

4. The method of claim 1, wherein said communicatively coupling the service provider device to the remote communication network is in response to establishing the first communication link between the service provider device and the electric vehicle and in response to determining that the electric vehicle is part of the local communication network.

5. The method of claim 1, further comprising:
   switching communication between the first communication medium and the powerline medium at periodic time intervals, or
   switching communication between the first communication medium and the powerline medium based, at least in part, on whether a message is available for communication via the first communication medium or the powerline medium.

6. The method of claim 1, wherein said communicatively coupling the service provider device to the remote communication network is in response to one of:
   receiving, by the service provider device, a notification from the electric vehicle to switch from communicating via the first communication medium to communicating via the powerline medium, or
   determining that the service provider device is communicatively coupled with the electric vehicle.

7. The method of claim 1, wherein said communicatively coupling the service provider device to the remote communication network comprises:
   transmitting a notification to the electric vehicle to instruct the electric vehicle to switch from communicating via the first communication medium to communicating via the powerline medium to cause the electric vehicle to communicatively couple with the remote communication network via the powerline medium.

8. The method of claim 1, further comprising:
   after establishing the first communication link via the first communication medium,
      determining a time instant at which to switch the service provider device from communicating via the first communication medium to communicating using the powerline medium; and
      switching, by the service provider device, to the powerline medium at the determined time instant.

9. The method of claim 8, further comprising:
  determining whether to notify the electric vehicle to switch to communicating via the powerline medium;
  in response to determining to notify the electric vehicle to switch to communicating via the powerline medium, transmitting one or more notification messages to the electric vehicle indicating at least the time instant at which the electric vehicle should switch to communicating via the powerline medium.

10. The method of claim 1,
  wherein the electric vehicle is a plug-in electric vehicle (PEV) or a hybrid plug-in vehicle (HPV), and
  wherein the service provider device is an electric vehicle supply equipment (EVSE).

11. The method of claim 1,
  wherein the first communication medium comprises a ground wire and a pilot wire of a charging harness that couples the service provider device and the electric vehicle,
  wherein the powerline medium comprises at least one member of the group consisting of:
    a first power supply wire and a second power supply wire of the charging harness,
    the first power supply wire and the ground wire of the charging harness, and
    the second power supply wire and the ground wire of the charging harness.

12. The method of claim 1, wherein said communicatively coupling the service provider device to the remote communication network comprises:
  switching the service provider device from communicating via the first communication medium to communicating via a combined communication medium that is a combination of the first communication medium and the powerline medium.

13. The method of claim 12, wherein the combined communication medium is formed by a combination of at least a ground wire, a pilot wire, a first power supply wire, and a second power supply wire of a charging harness that couples the service provider device and the electric vehicle.

14. The method of claim 13, wherein said switching the service provider device to the combined communication medium comprises:
  coupling, using a first switching device, the pilot wire with the first power supply wire; and
  coupling, using a second switching device, the ground wire with the second power supply wire.

15. The method of claim 12, wherein said switching the service provider device to the combined communication medium comprises:
  simultaneously coupling the service provider device to the local communication network and the remote communication network.

16. The method of claim 12, further comprising transmitting a frame via the combined communication medium, wherein transmitting the frame comprises at least one member of the group consisting of:
  transmitting the frame via both the first communication medium on the local communication network and the powerline medium, and
  transmitting the frame via the first communication medium to the local communication network or transmitting the frame via the powerline medium to the remote communication network based, at least in part, on information in the frame.

17. The method of claim 12, further comprising:
  after switching to the combined communication medium, communicating a first frame with at least the network device of the remote communication network via the powerline medium and simultaneously communicating a second frame with the electric vehicle via the first communication medium.

18. The method of claim 1, wherein said communicatively coupling the service provider device to the remote communication network comprises:
  determining one or more security credentials associated with the network device of the remote communication network on the powerline medium;
  joining, using the one or more security credentials, a first logical network associated with the network device; and
  simultaneously being a part of the first logical network associated with the network device and a second logical network associated with the electric vehicle, in response to joining the first logical network associated with the network device.

19. The method of claim 18, wherein said determining the one or more security credentials comprises at least one member of the group consisting of:
  receiving the one or more security credentials from the network device of the remote communication network; and
  accessing the one or more security credentials from a predetermined memory location.

20. The method of claim 1, further comprising:
  determining one or more security credential associated with the network device of the remote communication network;
  joining a logical network associated with the network device using the one or more security credentials;
  determining whether to provide the one or more security credentials to the electric vehicle;
  in response to determining to provide the one or more security credentials to the electric vehicle,
    transmitting the one or more security credentials to the electric vehicle to cause the electric vehicle to join the logical network associated with the network device; and
  in response to determining not to provide the one or more security credentials to the electric vehicle,
    enabling the electric vehicle to communicate with the network device of the remote communication network via the service provider device.

21. The method of claim 1, wherein the electric vehicle and the service provider device each comprises a powerline communication (PLC) device.

22. The method of claim 1, wherein the electric vehicle and the service provider device each comprises a HomePlug communication device.

23. The method of claim 1, further comprising:
  transmitting a first frame from the service provider device to the electric vehicle at a first transmit power level via the first communication medium,
  after establishing the first communication link between the service provider device and the electric vehicle,
    increasing a transmit power associated with the service provider device to a second transmit power level that is greater than the first transmit power level; and
  transmitting a second frame to the network device of the remote communication network using the second transmit power level via the powerline medium.

24. A method for network communication, the method comprising:
- establishing, via a first communication medium, a first communication link between an electric vehicle and a service provider device of a local communication network;
- receiving power by the electric vehicle from the service provider device via a powerline medium;
- communicatively coupling the electric vehicle to a remote communication network via the powerline medium;
- establishing, via the powerline medium, a second communication link between the electric vehicle and the service provider device, wherein the second communication link is usable by the electric vehicle to communicate with a network device of the remote communication network.

25. The method of claim 24, wherein
said establishing the first communication link comprises:
- communicating, from the electric vehicle, a first frame with the service provider device via the first communication medium; and said establishing the second communication link comprises:
- communicating, from the electric vehicle, a second frame with the network device of the remote communication network via the powerline medium.

26. The method of claim 24, further comprising:
after establishing the first communication link via the first communication medium:
- determining a time instant at which to switch from communicating via the first communication medium to communicating via the powerline medium; and
- causing the service provider device to switch to communicating via the powerline medium at the determined time instant to communicatively couple the electric vehicle to the remote communication network via the powerline medium.

27. The method of claim 26, further comprising:
- determining whether to notify the service provider device to switch to communicating via the powerline medium; and
- in response to determining to notify the service provider device to switch to communicating via the powerline medium,
  - transmitting one or more notification messages to the service provider device indicating at least the time instant at which the service provider device should switch to communicating via the powerline medium.

28. The method of claim 24,
- wherein the first communication medium comprises a ground wire and a pilot wire of a charging harness that couples the service provider device and the electric vehicle,
- wherein the powerline medium comprises at least one member of the group consisting of:
  - a first power supply wire and a second power supply wire of the charging harness,
  - the first power supply wire and the ground wire of the charging harness, and
  - the second power supply wire and the ground wire of the charging harness.

29. The method of claim 24, wherein said communicatively coupling the electric vehicle to the remote communication network via the powerline medium comprises:
- switching the electric vehicle from communicating via the first communication medium to communicating via a combined communication medium that is a combination of the first communication medium and the powerline medium.

30. The method of claim 29, wherein the combined communication medium is formed by a combination of at least a ground wire, a pilot wire, a first power supply wire, and a second power supply wire of a charging harness that couples the service provider device and the electric vehicle.

31. The method of claim 29, wherein said switching the electric vehicle to the combined communication medium comprises:
- simultaneously coupling the electric vehicle to the local communication network via the first communication medium and to the remote communication network via the powerline medium.

32. The method of claim 24, wherein said establishing the second communication link comprises:
- determining whether one or more security credentials associated with the network device of the remote communication network are received at the electric vehicle;
- in response to determining that the one or more security credentials are received at the electric vehicle,
  - joining, using the one or more security credentials, a logical network associated with the network device; and
- in response to determining that the one or more security credentials are not received at the electric vehicle,
  - causing the electric vehicle to communicate with the network device of the remote communication network via the service provider device.

33. The method of claim 24, wherein the electric vehicle and the service provider device each comprises a powerline communication (PLC) device.

34. The method of claim 24, further comprising:
- transmitting a first frame from the electric vehicle to the service provider device at a first transmit power level via the first communication medium,
- after establishing the first communication link between the electric vehicle and the service provider device,
  - increasing a transmit power associated with the electric vehicle to a second transmit power level that is greater than the first transmit power level;
  - transmitting a second frame to the network device of the remote communication network using the second transmit power level via the powerline medium.

35. A machine-readable storage medium having instructions stored therein, which when executed by one or more processors of a service provider device causes the service provider device to perform operations that comprise:
- establishing, via a first communication medium, a first communication link between the service provider device of a local communication network and an electric vehicle;
- providing power from the service provider device to the electric vehicle via a powerline medium after establishing the first communication link;
- communicatively coupling the service provider device to a remote communication network via the powerline medium; and
- establishing, via the powerline medium, a second communication link between the service provider device and the electric vehicle, wherein the second communication link is usable by the electric vehicle to communicate with a network device of the remote communication network.

36. The machine-readable storage medium of claim 35, wherein the operations further comprise:
determining whether to notify the electric vehicle to switch to communicating via the powerline medium;
in response to determining to notify the electric vehicle to switch to communicating via the powerline medium, transmitting one or more notification messages to the electric vehicle indicating at least a time instant at which the electric vehicle should switch to communicating via the powerline medium.

37. The machine-readable storage medium of claim 35, wherein the first communication medium comprises a ground wire and a pilot wire of a charging harness that couples the service provider device and the electric vehicle,
wherein the powerline medium comprises at least one member of the group consisting of:
a first power supply wire and a second power supply wire of the charging harness,
the first power supply wire and the ground wire of the charging harness, and
the second power supply wire and the ground wire of the charging harness.

38. The machine-readable storage medium of claim 35, wherein said operation of communicatively coupling the service provider device to the remote communication network comprises:
switching the service provider device from communicating via the first communication medium to communicating via a combined communication medium that is a combination of the first communication medium and the powerline medium to simultaneously couple the service provider device to the local communication network and the remote communication network.

39. The machine-readable storage medium of claim 35, wherein said operation of communicatively coupling the service provider device to the remote communication network comprises:
determining one or more security credentials associated with the network device of the remote communication network on the powerline medium;
joining, using the one or more security credentials, a first logical network associated with the network device; and
simultaneously being a part of the first logical network associated with the network device and a second logical network associated with the electric vehicle, in response to joining the first logical network associated with the network device.

40. A service provider device comprising:
a network interface; and
communication unit coupled with the network interface, the communication unit operable to:
establish, via a first communication medium, a first communication link between the service provider device of a local communication network and an electric vehicle;
provide power from the service provider device to the electric vehicle via a powerline medium after establishing the first communication link;
communicatively couple the service provider device to a remote communication network via the powerline medium; and
establish, via the powerline medium, a second communication link between the service provider device and the electric vehicle, wherein the second communication link is usable by the electric vehicle to communicate with a network device of the remote communication network.

41. The service provider device of claim 40,
wherein the first communication medium comprises a ground wire and a pilot wire of a charging harness that couples the service provider device and the electric vehicle,
wherein the powerline medium comprises at least one member of the group consisting of:
a first power supply wire and a second power supply wire of the charging harness,
the first power supply wire and the ground wire of the charging harness, and
the second power supply wire and the ground wire of the charging harness.

42. The service provider device of claim 40, wherein the communication unit operable to communicatively couple the service provider device to the remote communication network comprises the communication unit operable to:
switch the service provider device from communication via the first communication medium to communication via a combined communication medium that is a combination of the first communication medium and the powerline medium to simultaneously couple the service provider device to the local communication network and the remote communication network.

43. The service provider device of claim 40, wherein the communication unit operable to communicatively couple the service provider device to the remote communication network comprises the communication unit operable to:
determine one or more security credentials associated with the network device of the remote communication network on the powerline medium;
join, using the one or more security credentials, a first logical network associated with the network device; and
simultaneously join the first logical network associated with the network device and a second logical network associated with the electric vehicle, in response to joining the first logical network associated with the network device.

* * * * *